(12) United States Patent
Ko et al.

(10) Patent No.: US 11,178,811 B2
(45) Date of Patent: Nov. 23, 2021

(54) LAWN MOWER ROBOT, SYSTEM OF LAWN MOWER ROBOT AND CONTROL METHOD OF LAWN MOWER ROBOT SYSTEM

(71) Applicant: LG ELECTRONICS INC., Seoul (KR)

(72) Inventors: Kyoungsuk Ko, Seoul (KR); Sungwook Lee, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 16/531,222

(22) Filed: Aug. 5, 2019

(65) Prior Publication Data

US 2020/0037499 A1 Feb. 6, 2020

Related U.S. Application Data

(60) Provisional application No. 62/714,088, filed on Aug. 3, 2018, provisional application No. 62/714,746, filed on Aug. 5, 2018.

(30) Foreign Application Priority Data

Jan. 31, 2019 (KR) ........................ 10-2019-0012994

(51) Int. Cl.
*A01D 34/00* (2006.01)
*G05D 1/00* (2006.01)
(Continued)

(52) U.S. Cl.
CPC ......... *A01D 34/008* (2013.01); *G05D 1/0088* (2013.01); *G05D 1/0219* (2013.01);
(Continued)

(58) Field of Classification Search
CPC ............. A01D 34/008; A01D 2101/00; G05D 1/0088; G05D 1/0219; G05D 1/0282; G05D 1/0278; G05D 2201/0208
See application file for complete search history.

(56) References Cited

U.S. PATENT DOCUMENTS

| 2013/0041526 A1 | 2/2013 | Ouyang |
| 2014/0196967 A1 | 7/2014 | Chang et al. |

(Continued)

FOREIGN PATENT DOCUMENTS

| CN | 106171248 | 12/2016 |
| CN | 108142070 | 6/2018 |

(Continued)

OTHER PUBLICATIONS

Intellectual Property Australian Examination Report for Australian Application No. 2019210641 dated Oct. 8, 2020 (7 pages).
(Continued)

*Primary Examiner* — Michael J Zanelli
(74) *Attorney, Agent, or Firm* — Finnegan, Henderson, Farabow, Garrett & Dunner, LLP

(57) ABSTRACT

A lawn mower robot has a main body, and a driving unit configured to move the main body. The lawn mower robot also has a receiver configured to receive a signal transmitted from at least one transmission device in a travel area. The lawn more robot also has a controller. The controller controls the driving unit based on a result and a prestored area map. The result is based on the signal received by the receiver, and the area map includes an arrangement position of the at least one transmission device. The controller detects a position change of the at least one transmission device based on the result and updates the area map by determining a present position of the at least one transmission device in the area map according to the position change.

18 Claims, 12 Drawing Sheets

(51) Int. Cl.
  *G05D 1/02*   (2020.01)
  *A01D 101/00*   (2006.01)
(52) U.S. Cl.
  CPC ......... *G05D 1/0278* (2013.01); *G05D 1/0282* (2013.01); *A01D 2101/00* (2013.01); *G05D 2201/0208* (2013.01)

(56) References Cited

U.S. PATENT DOCUMENTS

| | | |
|---|---|---|
| 2016/0059875 A1 | 3/2016 | Segman et al. |
| 2016/0165795 A1* | 6/2016 | Balutis ................. G05D 1/0088 |
| | | 701/25 |
| 2016/0174459 A1 | 6/2016 | Balutis et al. |
| 2016/0366818 A1 | 12/2016 | Ouyang |
| 2017/0150676 A1 | 6/2017 | Yamauchi et al. |
| 2018/0139896 A1* | 5/2018 | Wahlgren ............. G05D 1/0278 |
| 2018/0348790 A1* | 12/2018 | Reigo .................... G01S 19/41 |
| 2020/0037498 A1 | 2/2020 | Ko et al. |
| 2020/0041601 A1 | 2/2020 | Ko et al. |

FOREIGN PATENT DOCUMENTS

| | | |
|---|---|---|
| CN | 108307767 | 7/2018 |
| DE | 102015218225 A | 4/2016 |
| EP | 3200040 A1 | 8/2017 |
| EP | 3561627 A1 | 10/2019 |
| ER | 2732687 A1 | 5/2014 |
| ER | 3073346 A1 | 9/2016 |
| FR | 3043304 A1 | 5/2017 |
| JP | 2017-531423 A | 10/2017 |
| KR | 2001-0009583 A | 2/2001 |
| KR | 10-2004-0081629 A | 9/2004 |
| KR | 10-2007-0061218 A | 6/2007 |
| KR | 10-2007-0109748 | 11/2007 |
| KR | 10-2009-0011418 | 2/2009 |
| KR | 10-2013-0014105 A | 2/2013 |
| KR | 10-2014-0066850 | 6/2014 |
| KR | 10-2014-0073657 | 6/2014 |
| KR | 10-2015-0125508 | 11/2015 |
| KR | 10-2016-0026293 A | 3/2016 |
| KR | 10-2016-0128124 A | 11/2016 |
| KR | 10-2016-0136131 | 11/2016 |
| KR | 10-2016-0149562 A | 12/2016 |
| KR | 10-2017-0073162 A | 6/2017 |
| KR | 10-1742913 | 6/2017 |
| KR | 10-2017-0082006 | 7/2017 |
| KR | 10-2017-0082016 | 7/2017 |
| KR | 10-2018-0038879 | 4/2018 |
| KR | 10-2018-0038879 A | 4/2018 |
| KR | 10-2018-0069237 | 6/2018 |
| KR | 10-2018-0085309 | 7/2018 |
| WO | WO 2015/072896 A1 | 5/2015 |
| WO | WO 2015/192902 A1 | 12/2015 |
| WO | WO 2016/057140 A1 | 4/2016 |
| WO | WO 2016/097900 A1 | 6/2016 |
| WO | WO 2016/160376 A1 | 10/2016 |
| WO | WO 2018/108179 A1 | 6/2018 |
| WO | WO 2018/132048 A1 | 7/2018 |

OTHER PUBLICATIONS

Office Action in Korean Application No. KR 10-2019-0012994 dated Jul. 25, 2020 (19 pages).
Extended European search report for corresponding European application No. 19189643.0, dated Dec. 20, 2019 (6 pages).
Extended European search report for corresponding European application No. 19189641.4-1006, dated Dec. 17, 2019 (8 pages).
Extended European search report for European application No. 19189646.3-1004, dated Apr. 24, 2020 (10 pages).
Office Action in Korean Application No. KR 10-2019-0012990 dated Jul. 9, 2020 (14 pages).
Office Action in Korean Application No. KR 10-2019-0012989 dated Jul. 9, 2020 (17 pages).
Leonard, John J., "Mobile Robot Localization by Tracking Geometric Beacons", IEEE Transactions on Robotics and Automation, vol. 7, No. 3, Jun. 1991 (7 pages).
Australian Examination Report for Application No. 201908265, dated May 6, 2020 (6 pages).
Li, Zengke et al., "An Approach to Improve the Positioning Performance of GPS/INS/UWB Integrated System with Two-Step Filter", Remote Sensing, Dec. 23, 2017 (14 pages).
Korean Office Action in Application No. KR 10-2019-0068832 dated Jul. 30, 2020 (5 pages).
Korean Office Action in Application No. KR 10-2019-0050058 dated Nov. 16, 2020 (5 pages).
Notice of Allowance in Application No. KR 10-2019-0012994 dated Mar. 22, 2021 (3 pages).
Notice of Allowance in Application No. KR 10-2019-0012989 dated Jan. 25, 2021 (2 pages).
U.S. Appl. No. 16/526,314, filed Jul. 30, 2019.
U.S. Appl. No. 16/531,260, filed Jul. 30, 2019.
U.S. Appl. No. 17/265,671, filed Feb. 3, 2021.
U.S. Appl. No. 17/265,590, filed Feb. 3, 2021.
U.S. Appl. No. 17/265,633, filed Feb. 3, 2021.
U.S. Appl. No. 17/265,613, filed Feb. 3, 2021.
U.S. Appl. No. 17/265,761, filed Feb. 3, 2021.
U.S. Appl. No. 17/266,481, filed Feb. 5, 2021.
U.S. Appl. No. 17/266,457, filed Feb. 3, 2021.
Notice of Allowance in Application No. KR 10-2019-0050959 dated May 27, 2021 (2 pages).
Notice of Allowance in Application No. KR 10-2019-0050956 dated Jul. 19, 2021 (2 pages).

\* cited by examiner

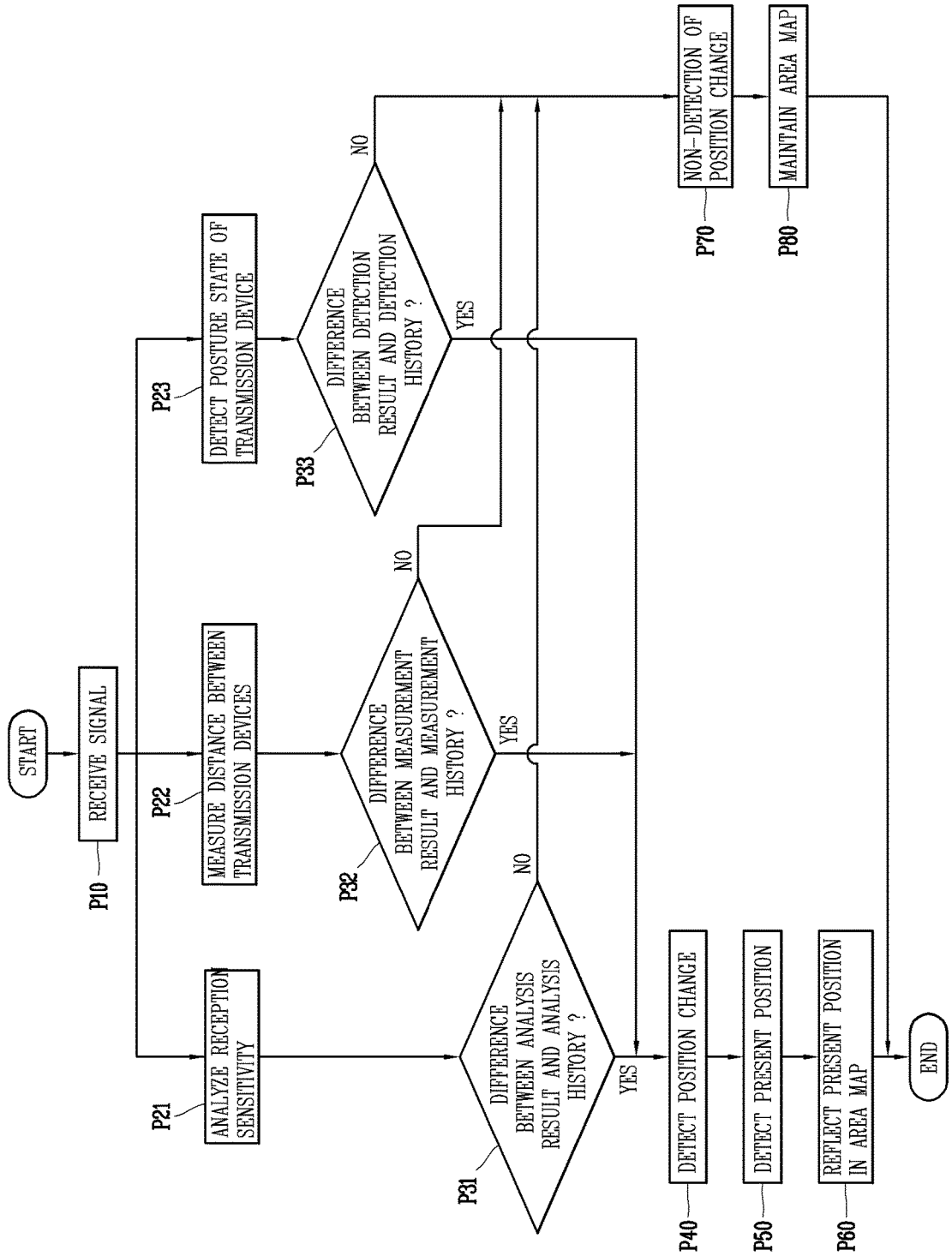

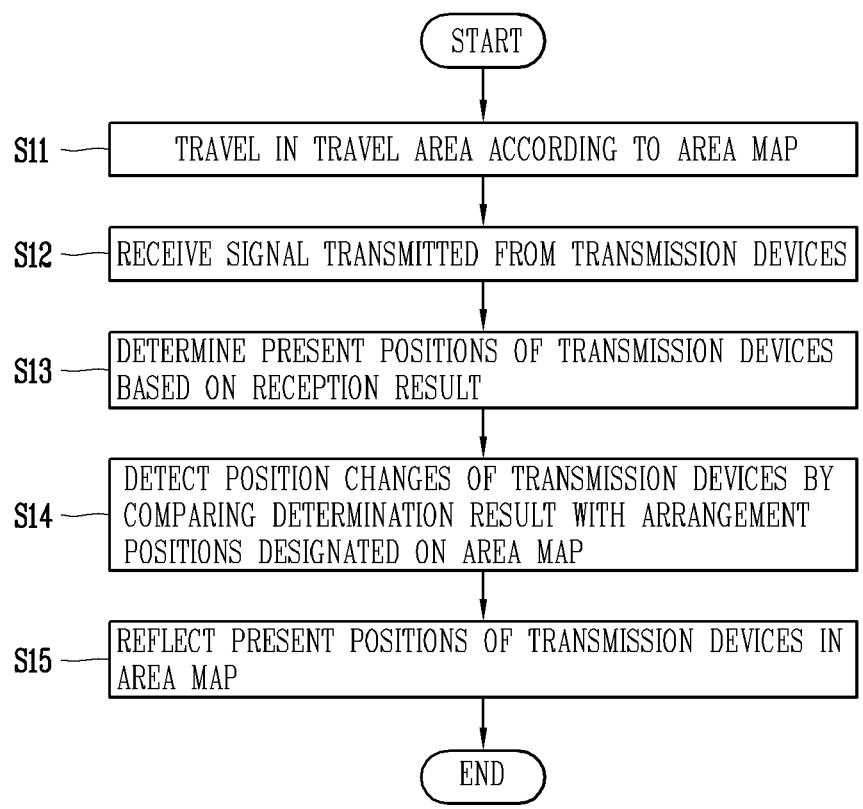

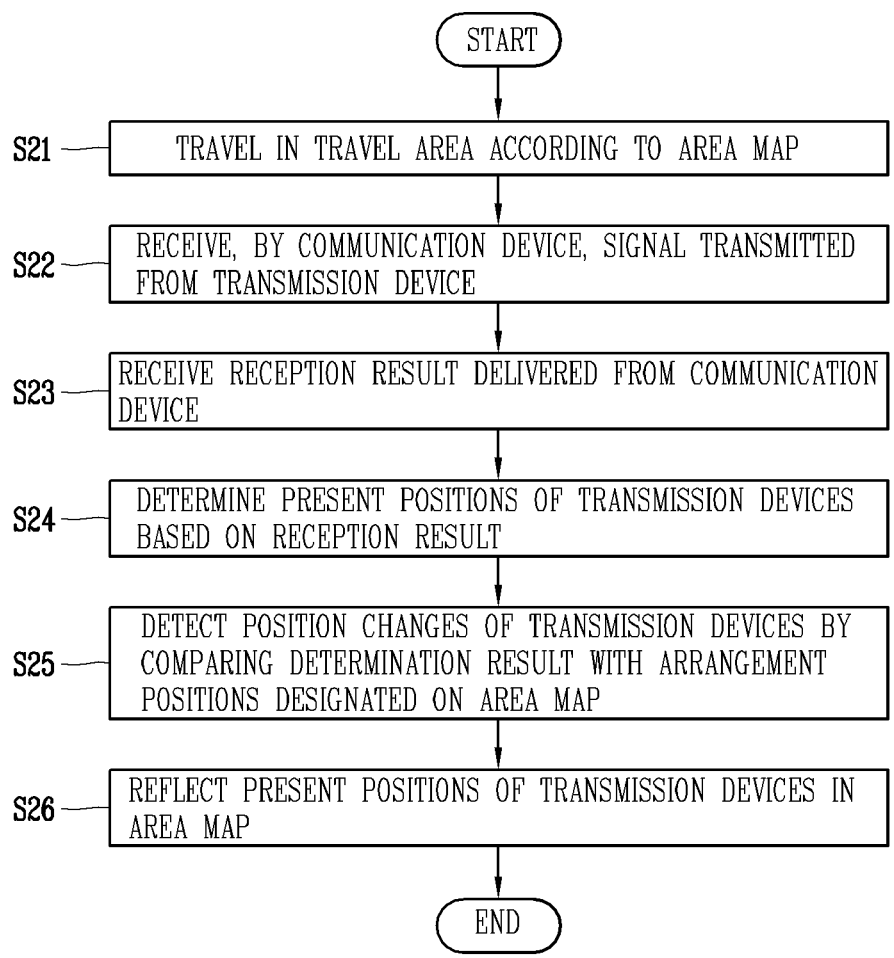

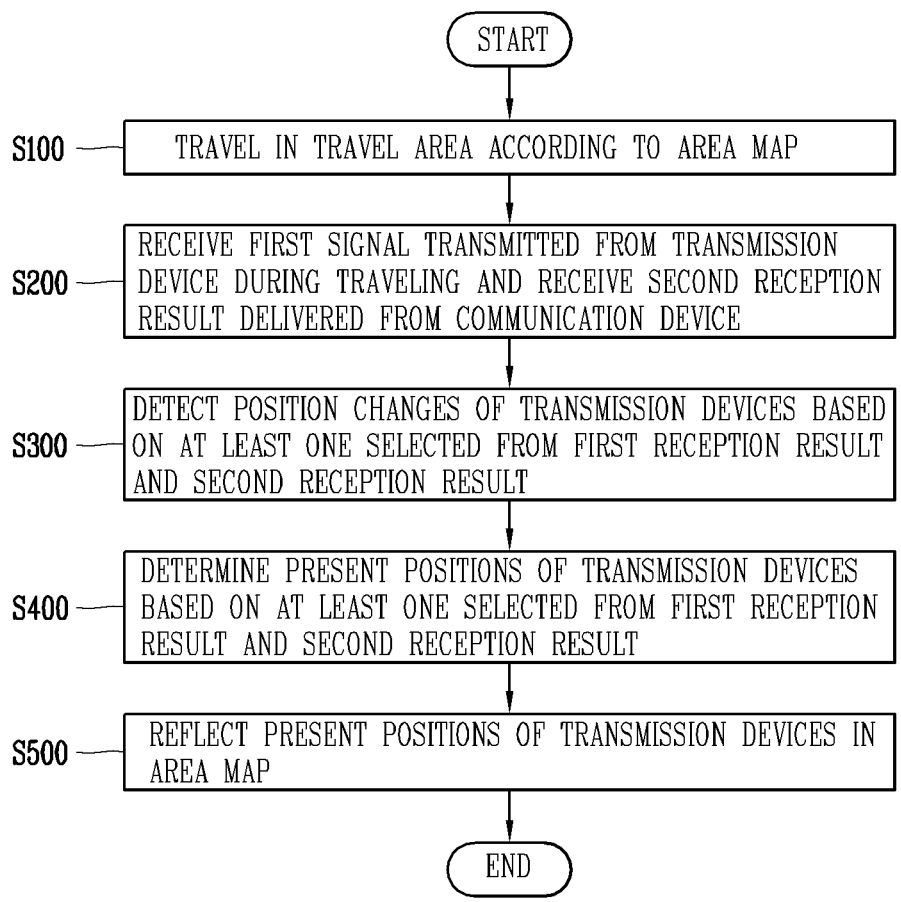

LAWN MOWER ROBOT, SYSTEM OF LAWN MOWER ROBOT AND CONTROL METHOD OF LAWN MOWER ROBOT SYSTEM

CROSS-REFERENCE TO RELATED APPLICATIONS

Pursuant to 35 U.S.C. § 119(a), this application claims the benefit of an earlier filing date of and the right of priority to U.S. Provisional Patent Application No. 62/714,088, filed on Aug. 3, 2018, U.S. Provisional Patent Application No. 62/714,746, filed on Aug. 5, 2018 and Korean Application No. 10-2019-0050959, filed on Apr. 30, 2019, the contents of which are incorporated by reference herein in their entirety.

BACKGROUND

1. Field of the Disclosure

The present disclosure relates to a lawn mower robot that autonomously travels in a travel area, a lawn mower robot system, and a control method of the lawn mower robot system.

2. Description of the Related Art

Generally, a lawn mower robot is a device that automatically performs a predetermined operation while traveling by itself in a predetermined area without a user's operation. The lawn mower robot senses obstacles located in the area and performs its operations by moving close to or away from such obstacles.

Such a lawn mower robot may include a cleaning robot that carries out cleaning while traveling in an area, as well as a lawn mower robot that mows the grass on a bottom of the area. Generally, a lawn mower includes a passenger type that is driven by a user who is on board in the mower to mow the lawn or cut the grass during movement, and a work-behind type or hand-operating type that is pulled or pushed manually by a user to cut the grass. Such lawn mower is moved by a direct control of the user to mow the lawn, which causes user's inconvenience in that the device is operated only directly by the user. Accordingly, a lawn mower robot type lawn mower that an element for mowing the lawn is provided on a lawn mower robot, namely, a lawn mower robot has been studied. However, since a lawn mower robot operates outdoors as well as indoors, there is a need to set an area in which the lawn mower robot is to move. In detail, since an outdoor area is an open space unlike an indoor area, the area in which the lawn mower robot is to move needs to be designated in the outdoor area in advance, and the area needs to be limited so that the lawn mower robot travels in a place in which the lawn is planted.

In relation to this, Korean Patent Publication No. 10-2015-0125508 (published on Nov. 9, 2015) (hereinafter referred to as prior art document 1) discloses technology of burying a wire in a lawn-planted area to set an area in which the lawn mower robot is to move, to thereby control the lawn mower robot to move in an inner area with reference to the wire. Then, a boundary for the lawn mower robot is set based on a voltage value induced by the wire. However, although such a method for using a wire makes it easy to recognize a position of a boundary portion of a travel area and perform traveling, there is a limit in improving position recognition and traveling in a wide travel area within the boundary portion.

In addition, US Publication No. 2017-0150676 (published on Jun. 1, 2017) (hereinafter referred to as prior art document 2) discloses technology of installing a plurality of beacons at a boundary portion of a travel area, determining a relative position of a robot with respect to the plurality of beacons, based on signals transmitted from the plurality of beacons while the robot is traveling along a boundary, and storing coordinate information and using the coordinate information to determine a position. That is, in prior art document 2, the robot transmits or receives signals with the plurality of beacons provided in the boundary portion of the travel area in a distributed manner, the travel area is set based on a result of the transmission and reception, and thus, accurate travel area/position recognition is performed using relative position information with respect to the plurality of beacons. Accordingly, a restriction on position recognition that was a limit in prior art document 1 may be partially resolved.

According to technology disclosed in the prior art 2 described above, locations of the beacons may be moved due to characteristics of outdoor environments. For example, there may be such cases when the beacons are moved due to an influence of a wind direction or a terrain, or for a purpose of resetting a position recognized area. When the locations of the beacons are changed, since an area map generated based on an installation position of the beacons does not match an actually changed position of the beacons, position recognition is not accurately performed. That is, due to the position change of the beacons, since relative positions of the beacons are changed, an area map generated based on information about the relative positions is different from a present area state. Accordingly, the position recognition is inaccurately performed. This adversely affects traveling of the robot. Resultantly, deterioration of the accuracy, stability, reliability and effect of the traveling operation of the robot may be caused.

That is, in the related art, a problem of position change of an element for position recognition occurs. Due to such a problem, there has been a limit in utilization and an effect of the element for position recognition.

SUMMARY

Therefore, an aspect of the present disclosure is to overcome limitations of the related art described above.

In detail, an aspect of the present disclosure is to provide a lawn mower robot, a lawn mower robot system, and a control method of the lawn mower robot system, whereby a position change of a signal transmission element may be detected when a position of the signal transmission element in a travel area is changed.

Also, an aspect of the present disclosure is to provide the lawn mower robot, the lawn mower robot system, and the control method of the lawn mower robot system, whereby accurate position recognition and driving may be performed according to a changed position of the signal transmission element when a position of the signal transmission element is changed.

In addition, an aspect of the present disclosure is to provide the lawn mower robot, the lawn mower robot system, and the control method of the lawn mower robot system, whereby the lawn mower robot may be accurately and properly controlled using the signal transmission element.

In order to solve such problems described above, an aspect of the present disclosure is to provide the lawn mower robot, the lawn mower robot system, and the control method of the lawn mower robot system, whereby a position change is detected based on a signal transmitted from the signal transmission element.

In detail, a signal transmitted from the signal transmitting element is compared with a detection result according to previous reception history, a position change of the signal transmission element is detected according to a result of the comparison, and an area map that is a basis for controlling traveling is updated according to a result of the detection.

Alternatively, a present position of the signal transmission element may be determined based on the signal transmitted from the signal transmission element and functioning as a basis for position determination, the present position of the signal transmission element is compared with an arrangement position of the signal transmission element in the area map, a position change of the signal transmission element is detected according to a result of the comparison, and an area map that a basis for controlling traveling is updated according to a result of the detection.

That is, the lawn mower robot, the lawn mower robot system, and the control method of the lawn mower robot system according to the present disclosure may be configured such that a position change of the signal transmission element is detected based on a result of receiving a signal transmitted from the signal transmission element, and a present position of the signal transmission element according to the position change is reflected in the area map.

An aspect of the present disclosure is to provide the lawn mower robot, the lawn mower robot system, and the control method of the lawn mower robot, whereby a position change of the signal transmission element in a travel area is detected when a position of the signal transmission element is changed.

The technical features herein may be implemented as a control element for a lawn mower robot, a lawn mower robot system, a control system for the lawn mower robot, a control method of a lawn mower robot, a method for detecting a position change of a transmission device in the lawn mower robot, a method of updating an area map for a lawn mower robot, a control element for a lawn mower robot, a lawn mowing robot, a lawn mowing robot system, a control system for the lawn mowing robot, a control method of a lawn mowing robot, a method for detecting a position change of a lawn mowing robot, a method for updating an area map for a lawn mowing robot, or the like. This specification provides embodiments of the lawn mower robot, the lawn mower robot system, and a control method of the lawn mower robot having the above-described technical features.

To achieve these and other advantages and in accordance with the purpose of this specification, as embodied and broadly described herein, there is provided a lawn mower robot including a main body, a driving unit that moves the main body, a receiver that receives a signal transmitted from at least one transmission device in a travel area, and a controller that controls traveling of the main body by controlling the driving unit so that the main body travels in the travel area, based on a result of the reception by the receiver and a prestored area map in which an arrangement position of the at least one transmission device is designated, wherein the controller detects a position change of the at least one transmission device based on the reception result and updates the prestored area map by reflecting, in the area map, a present position of the at least one transmission device according to the position change.

To achieve these and other advantages and in accordance with the purpose of this specification, as embodied and broadly described herein, there is provided a lawn mower robot including a main body, a driving unit that moves the main body, a communication unit that communicates with a communication device, which receives a signal transmitted from at least one transmission device provided in a travel area, and thus, receives a result of the reception of the signal, and a controller that controls traveling of the main body by controlling the driving unit, based on the reception result and a prestored area map in which an arrangement position of the at least one transmission device are designated, wherein the controller determines a present position of the at least one transmission device based on the reception result, detects a position change of the at least one transmission device based on a result of comparing a result of the determination with the prestored area map, and thus, reflects the present position of the at least one transmission device in the prestored area map to thereby update the prestored area map.

To achieve these and other advantages and in accordance with the purpose of this specification, as embodied and broadly described herein, there is provided a lawn mower robot including a main body, a driving unit that moves the main body, a receiver that receives a first signal transmitted from at least one transmission device in a travel area, a communication unit that communicates with a communication device, which receives a second signal transmitted from at least one transmission device provided in a travel area, and thus, receives a result of the reception of the signal delivered from the communication device, and a controller that controls traveling of the main body by controlling the driving unit so that the main body travels in the travel area, based on at least one selected from a result of the reception by the receiver and a prestored area map in which an arrangement position of the at least one transmission device is designated, wherein the controller determines a present position of the at least one transmission device base on at least one of the reception result and a result of the communication, detects a position change of the at least one transmission device based on a result of comparing the present position of the at least one transmission device with a present position designated in the prestored area map, and thus, reflects the present position of the at least one transmission device in the prestored area map.

To achieve these and other advantages and in accordance with the purpose of this specification, as embodied and broadly described herein, there is provided a lawn mower robot system including a plurality of transmission devices that are provided in a travel area and transmit first and second signals for determining position information, a communication device that receives the second signal and delivers a result of the reception to a lawn mower robot, and the lawn mower robot that receives the first signal, receives the reception result of the second signal delivered from the communication device, and performs a set operation during the traveling in the travel area, based on at least one selected from a first reception result of the first signal and a second reception result of the second signal, and a prestored area map in which arrangement positions of the plurality of transmission devices are designated, wherein the lawn mower robot detects position changes of the plurality of transmission devices based on at least one of the first reception result and the second reception result and reflects, in the prestored area map, the present positions of the plurality of transmission devices according to the position changes.

To achieve these and other advantages and in accordance with the purpose of this specification, as embodied and broadly described herein, there is provided a control method of a lawn mower robot system including: a plurality of transmission devices that are provided in a travel area and transmit a signal for determining position information, and a lawn mower robot that performs a set operation while traveling in the travel area based on a result of receiving the signal transmitted from the plurality of transmission devices and a prestored area map in which arrangement positions of the plurality of transmission devices are designated, the control method including: traveling in the traveling area according to the prestored area map, receiving the signal transmitted from the plurality of transmission devices during the traveling, determining present positions of the plurality of transmission devices based on the reception result, detecting position changes of the plurality of transmission devices by comparing a result of the determination with the arrangement positions designated in the prestored area map, and reflecting the present positions of the plurality of transmission devices on the prestored area map.

To achieve these and other advantages and in accordance with the purpose of this specification, as embodied and broadly described herein, there is provided a control method of a lawn mower robot system including a plurality of transmission devices that are provided in a travel area and transmit a signal for determining position information, a communication device that receives the signal and delivers a result of the reception to a lawn mower robot, and a lawn mower robot that performs a set operation during the traveling in the travel area based on the reception result delivered from the communication device and a prestored area map in which arrangement positions of the plurality of transmission devices are designated, the control method including: traveling in the traveling area according to the prestored area map, receiving, by the communication device, the signal transmitted from the plurality of transmission devices, receiving a result of the reception delivered from the communication device, determining present positions of the plurality of transmission devices based on the reception result, detecting position changes of the plurality of transmission devices by comparing a result of the determination with the arrangement positions designated in the prestored area map, and reflecting the present positions of the plurality of transmission devices on the prestored area map.

To achieve these and other advantages and in accordance with the purpose of this specification, as embodied and broadly described herein, there is provided a control method of a lawn mower robot system including a plurality of transmission devices that are provided in a travel area and transmit first and second signals for determining position information, a communication device that receives the second signal and delivers a result of the reception to the lawn mower robot, and the lawn mower robot that receives the first signal, receives the reception result of the second signal delivered from the communication device, and performs a set operation during the traveling in the travel area based on at least one selected from a first reception result of the first signal and a second reception result of the second signal, and a prestored area map in which arrangement positions of the plurality of transmission devices are designated, the control method including traveling in the traveling area according to the prestored area map, receiving the first signal transmitted from the plurality of transmission devices during the traveling, receiving the second reception result delivered from the communication device, detecting position changes of the plurality of transmission devices based on at least one of the first reception result and the second reception result, determining present positions of the plurality of transmission devices based on at least one of the first reception result and the second reception result, and reflecting the present positions of the plurality of transmission devices in the prestored area map.

TECHNICAL EFFECTS

A lawn mower robot, a lawn mower robot system, and a control method of the lawn mower robot system according to the present disclosure may have an effect of detecting a change of a position of a signal transmission element when the position of the signal transmission element is changed, by detecting the position change based on a signal transmitted from the signal transmission element.

In addition, the lawn mower robot, the lawn mower robot system, and the control method of the lawn mower robot system according to the present disclosure may have an effect of providing accurate position recognition and traveling according to the changed position by detecting the position change based on the signal transmitted from the signal transmission element.

Accordingly, the lawn mower robot, the lawn mower robot system, and the control method of the lawn mower robot system according to the present disclosure may have an effect of accurately and properly controlling the lawn mower robot using the signal transmission element, and updating an area map according to a result of the detection.

Further, the lawn mower robot, the lawn mower robot system, and the control method of the lawn mower robot system according to the present disclosure may have an effect of conveniently and quickly detecting the position change of the signal transmission element when the position of the signal transmission element in a travel area is changed, by detecting the position change based on the signal transmitted from the signal transmission element.

As a result, the lawn mower robot, the lawn mower robot system, and the control method of the lawn mower robot system according to the present disclosure have such effects that limitations of the prior art may be resolved, and accuracy, reliability, stability, applicability, efficiency, effectiveness, and utilization in the technical field of lawn mower robots for lawn mowing in which a signal transmission element is utilized/adopted may be enhanced.

BRIEF DESCRIPTION OF THE DRAWINGS

FIG. 6 is a flowchart illustrating a process of detecting a position change according to an embodiment of the lawn mower robot according to the present disclosure.

FIG. 8 is a flowchart illustrating a sequence according to an embodiment of a control method for the lawn mower robot system according to the present disclosure.

FIG. 9 is a flowchart illustrating a sequence according to an embodiment of a control method for the lawn mower robot system according to the present disclosure.

FIG. 10 is a flowchart illustrating a sequence according to an embodiment of a control method for the lawn mower robot system according to the present disclosure.

DETAILED DESCRIPTION

Figure 1A:
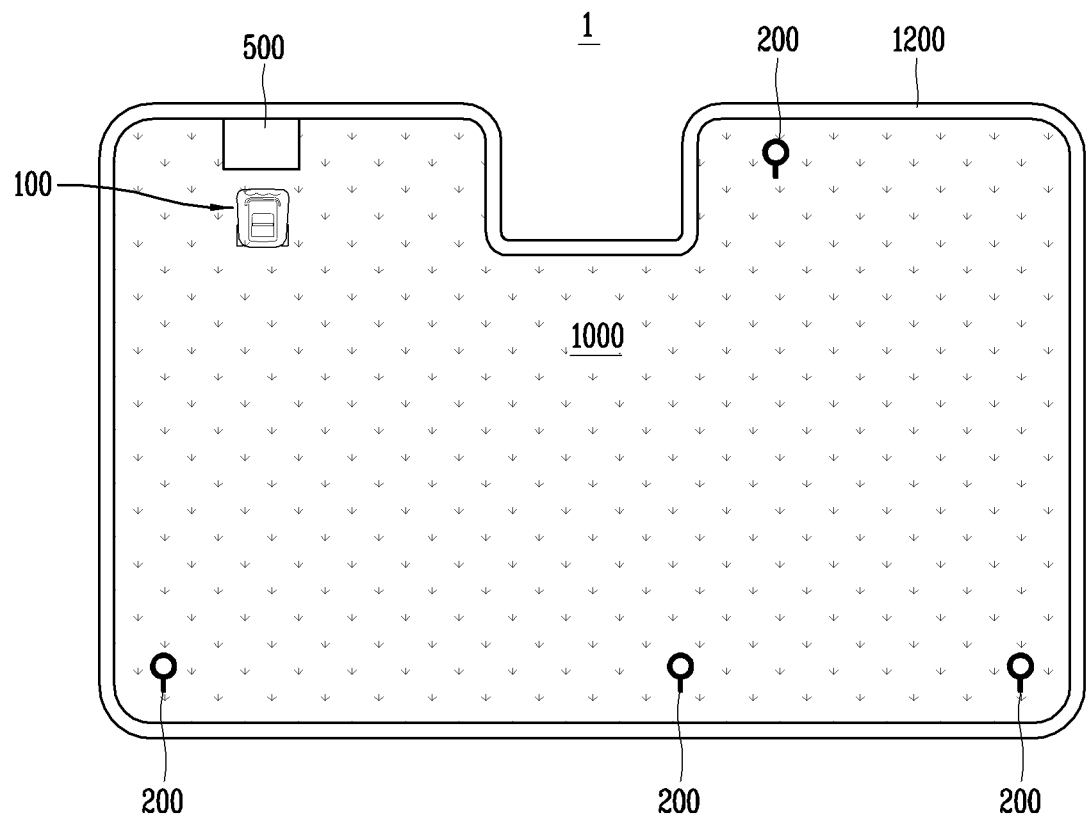
FIG. 1A is a configuration diagram illustrating an embodiment of a lawn mower robot and a lawn mower robot system according to the present disclosure.

Hereinafter, embodiments of a lawn mower robot and a control method of lawn mower robot according the present disclosure will be described in detail with reference to the accompanying drawings, and the same reference numerals are used to designate the same/like components and redundant description thereof will be omitted.

In describing technologies disclosed in the present disclosure, if a detailed explanation for a related known function or construction is considered to unnecessarily divert the gist of the technologies in the present disclosure, such explanation has been omitted but would be understood by those skilled in the art. It should be noted that the attached drawings are provided to facilitate understanding of the technical idea disclosed in this specification, and should not be construed as limiting the technical idea by the attached drawings.

Hereinafter, an embodiment of a lawn mower robot (hereinafter referred to as a robot) according to the present disclosure will be described.

The robot may refer to a robot capable of autonomous traveling, a lawn mowing moving robot, a lawn mowing robot, a lawn mowing device, or a moving robot for lawn mowing. As shown in FIG. 1A, the robot 100 travels in a travel area 1000 that is set, and cuts a lawn in the travel area 1000.

Figure 1B:
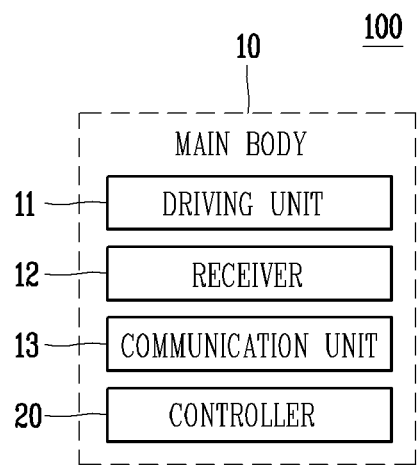
FIG. 1B is a configuration diagram illustrating the lawn mower robot according to the present disclosure.

As shown in FIG. 1B, the robot 100 includes a main body 10, a driving unit 11, a receiver 12, and a controller 20, wherein the driving unit 11 moves the main body 10, the receiver 12 receives a signal transmitted from at least one transmission device 200 provided in the travel area 1000, and the controller 20 controls traveling of the main body 10 by controlling the driving unit 11 so that the main body 10 travels in the travel area 1000. The controller 20 may control the driving unit 11 based on a result of reception of the signal by the receiver 12 and a prestored area map in which an arrangement position of the at least one transmission device 200 is designated.

That is, as the controller 20 controls the driving unit 11 so that the robot 100 travels in the travel area 1000, based on the result of the reception by the receiver 12 and the prestored area map in which an arrangement position of the at least one transmission device 200 is designated, the robot 100 travels in the travel area 1000.

Here, the robot 100 may further include a communication unit 13 for communicating with an external communication target element.

As such, in the robot 100 including the main body 10, the driving unit 11, the receiver 12 and the controller 20, the controller 20 detects a position change of the transmission device 200 based on the reception result, and updates the area map by determining a present position of the transmission device 200 according to the position change in the area map. The present position may be reflected in the area map.

That is, when a position of the transmission device 200 is changed in the travel area 1000, the controller 20 in the robot 100 detects a position change of the transmission device 200 based on the result of the reception by the receiver 12, and updates the area map based on the present position of the transmission device 200 so that the present position of the transmission device 200 is reflected in the area map.

Figure 1C:
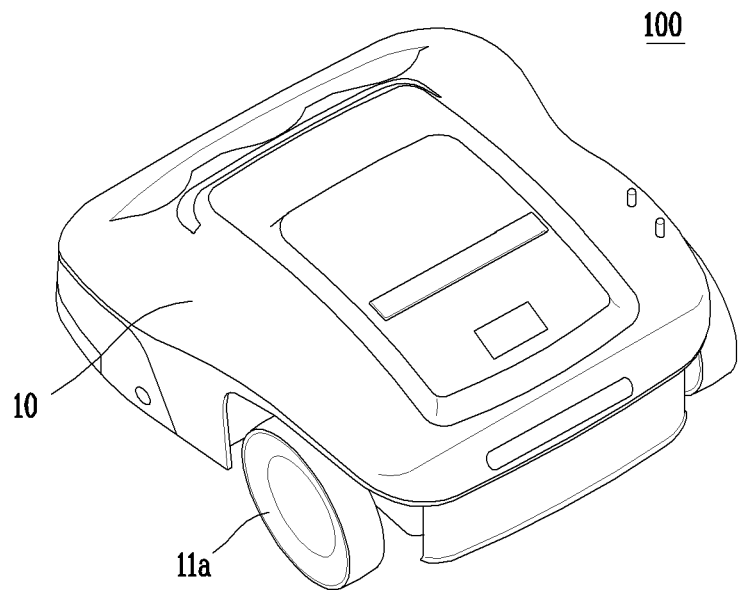
FIG. 1C is a configuration diagram illustrating the lawn mower robot according to the present disclosure.
Figure 1D:
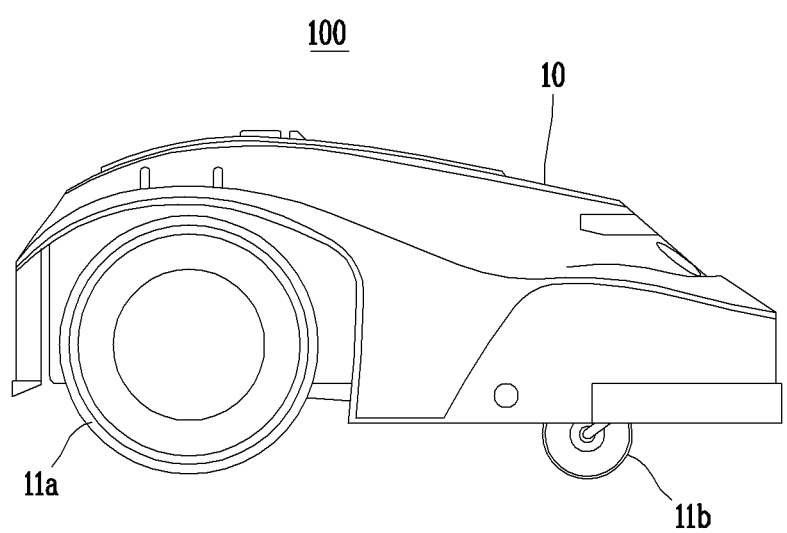
FIG. 1D is a configuration diagram illustrating the lawn mower robot according to the present disclosure.

As shown in FIGS. 1C and 1D, the robot 100 may be an autonomous traveling robot including the main body 10 capable of moving and cutting a lawn. The main body 10 forms an outer shape of the robot 100 and includes one or more elements performing operations such as traveling of the robot 100 and cutting of a lawn. The main body 10 includes the driving unit 11 that may move the main body 10 in a desired direction and rotate the main body 10. The driving unit 11 may include a driver, such as a motor. The driving unit 11 may include a plurality of rotatable driving wheels. Each of the driving wheels may individually rotate so that the main body 10 may rotate in a desired direction. In detail, the driving unit 11 may include at least one main driving wheel 11a and an auxiliary wheel 11b. For example, the main body 10 may include two main driving wheels 11a, and the two main driving wheels 11a may be installed on a rear lower surface of the main body 10.

Figure 2:
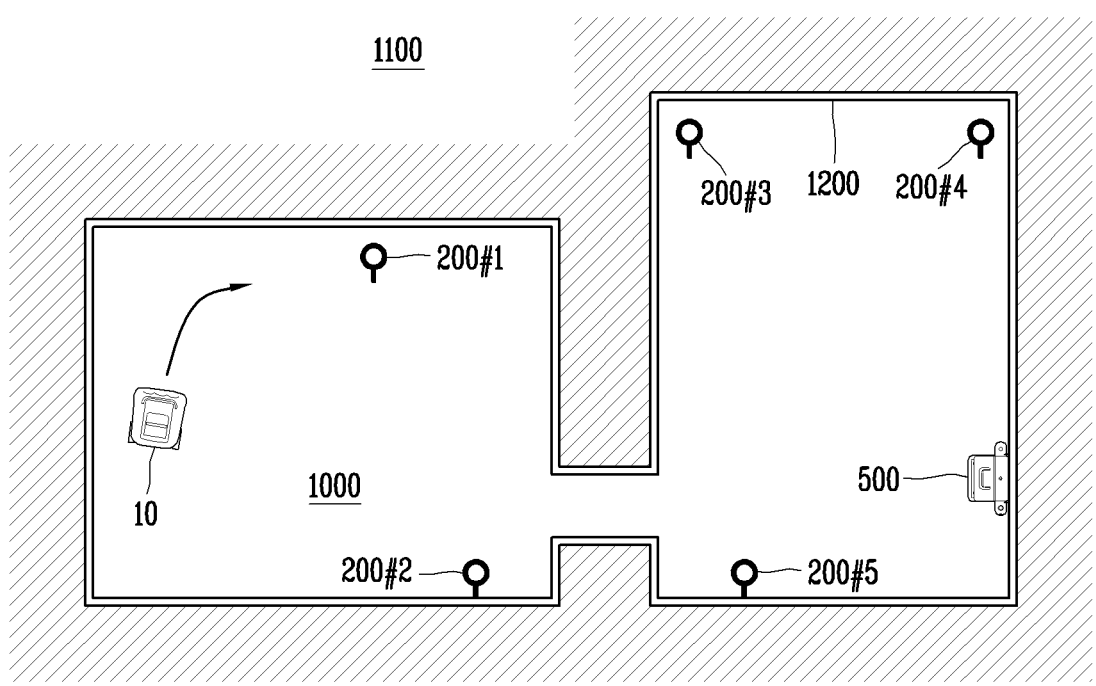
FIG. 2 is a conceptual diagram illustrating an embodiment of a travel area of the lawn mower robot according to the present disclosure.

The robot 100 may travel by itself in the travel area 1000 shown in FIG. 2. The robot 100 may perform a particular operation during the traveling. Here, the particular operation may be an operation of cutting a lawn in the travel area 1000. The travel area 1000 is a target area in which the robot is to travel and operate. A predetermined outside/outdoor area may be provided as the travel area 1000. For example, a garden, a yard, or the like in which the robot 100 is to cut a lawn may be provided as the travel area 1000. The charging apparatus 500 for charging the robot 100 with driving power may be installed in the travel area 1000. The robot 100 may be charged with driving power by docking on the charging apparatus 500 installed in the travel area 1000.

The travel area 1000 may be provided as a boundary area 1200 that is predetermined, as shown in FIG. 2. The boundary area 1200 corresponds to a boundary line between the travel area 1000 and an outside area 1100, and the robot 100 may travel in the boundary area 1200 not to deviate to the outside area 1100. In this case, the boundary area 1200 may be formed to have a closed curved shape or a closed loop shape. Also, in this case, the boundary area 1200 may be defined as a wire 1200 formed to have a shape of a closed curve or a closed loop. The wire 1200 may be installed in an arbitrary area. The robot 100 may travel in the travel area 1000 having a closed curved shape formed by the installed wire 1200.

As shown in FIG. 2, a transmission device 200 may be provided in the travel area 1000. At least one transmission device 200 may be provided in the travel area 1000. At least three transmission devices 200 may be preferably provided in a distributed manner. The at least one transmission device 200 is a signal generation element configured to transmit a signal via which the robot 100 determines position information. The at least one transmission device 200 may be installed in the travel area 1000 in a distributed manner. The robot 100 may receive a signal transmitted from the transmission device 200 to thereby determine a present position of the robot 100 based on a result of the reception or determine position information regarding the travel area 1000. In this case, in the robot 100, the receiver 12 may receive the transmitted signal. The transmission device 200 may be provided in a periphery of the boundary area 1200 of the travel area 1000. In this case, the robot 100 may determine the boundary area 1200 based on an arrangement position of the transmission device 200 in the periphery of the boundary area 1200. The transmission device 200 may include an inertial measurement unit (IMU) sensor that detects posture information of the transmission device 200. The IMU sensor is a sensor including at least one selected from a gyro sensor, an acceleration sensor, and an altitude sensor. The IMU sensor may be a sensor that senses posture information of the transmission device 200. Accordingly, the transmission device 200 may sense posture information of the transmission device 200 according to a present arrangement state of the transmission device 200 via the IMU sensor. Further, when a posture is changed according to a change of a position, the transmission device 200 may sense the change of the posture according to the position change via the IMU sensor.

Figure 3A:
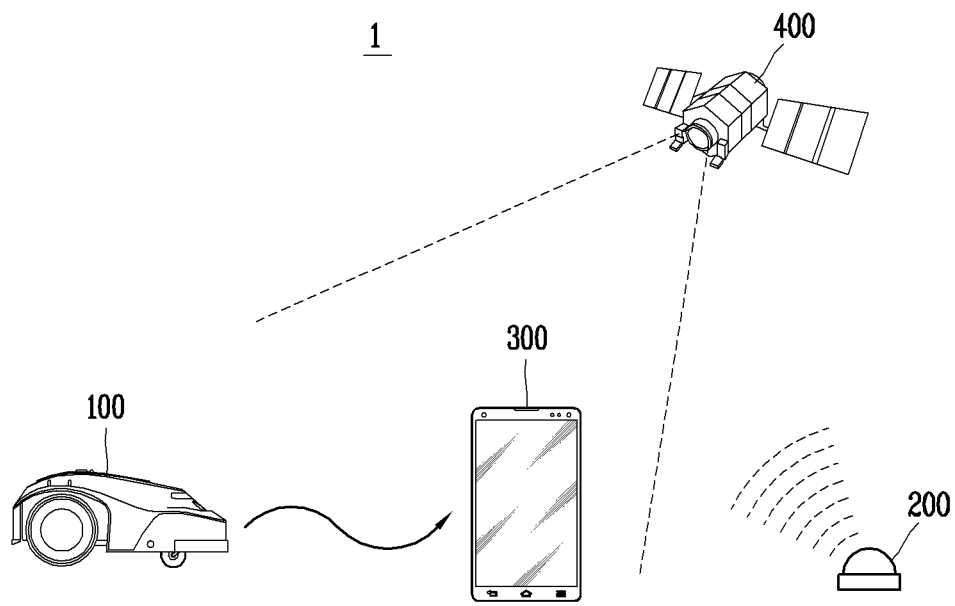
FIG. 3A is a conceptual diagram illustrating a traveling principle of the lawn mower robot and the lawn mower robot system according to the present disclosure.
Figure 3B:
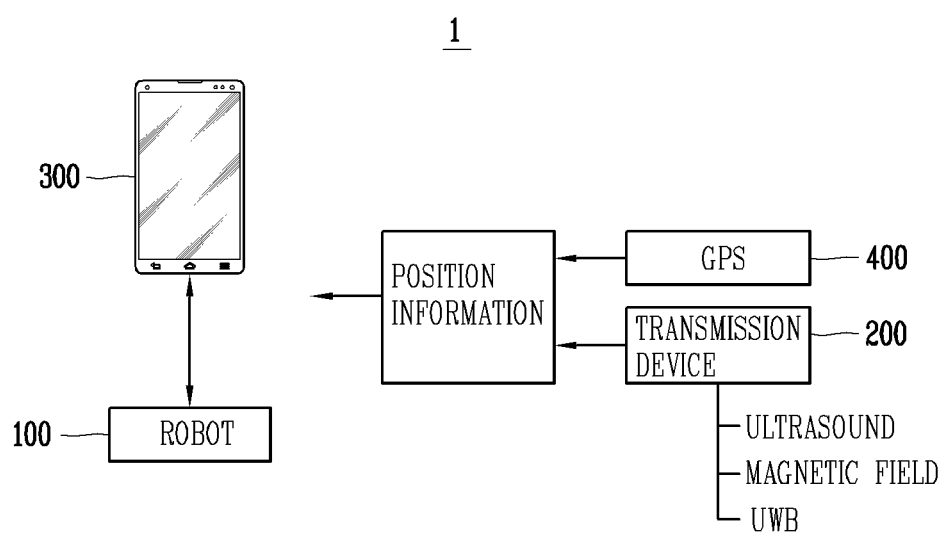
FIG. 3B is a conceptual diagram illustrating a signal flow between devices to determine positions of the lawn mower robot and the lawn mower robot system according to the present disclosure.

The robot 100 that travels in the travel area 1000 and cuts a lawn as shown in FIG. 2 may operate according to a traveling principle shown in FIG. 3A, and a signal may flow between devices for determining a position as shown in FIG. 3B.

As shown in FIG. 3A, the robot 100 may communicate with a terminal 300 moving in a predetermined area, and travel by following a position of the terminal 300 based on data received from the terminal 300. The robot 100 may set a virtual boundary in a predetermined area based on position information received from the terminal 300 or collected while the robots 100 is traveling by following the terminal 300, and set an internal area formed by the virtual boundary as the travel area 1000. When the boundary area 1200 and the travel area 1000 are set, the robot 100 may travel in the travel area 1000 not to deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen and monitor operation of the robot 100.

The robot 100 or the terminal 300 may determine a present position of the robot 100 by receiving position information. The robot 100 and the terminal 300 may determine the present position based on a signal for position information transmitted from the transmission device 200 in the travel area 1000 or a global positioning system (GPS) signal obtained using a GPS satellite 400. For example, a distance between the robot 100 and the transmission device 200 may be measured based on a reception receptivity, a reception direction, reception time, or the like of the signal. Then, based on this, the present position may be determined by determining a position of the transmission device 200 in the travel area 1000. Here, when signals are received from a plurality of transmission devices 200, positions of the robot 100 and the plurality of transmission devices 200 may be determined by comparing results of receiving signals from the plurality of transmission devices 200 with each other, respectively, to thereby determine positions of the robot 100 and the plurality of transmission devices 200. Alternatively, the present position may be determined by receiving a GPS signal transmitted from the GPS module included in the transmission device 200 and determining a position of the transmission device 200 based on the GPS signal. In addition, positions of the robot 100 and the plurality of transmission devices 200 may be accurately determined by determining distances between the plurality of transmission devices 200 based on respective positions of the plurality of transmission devices 200. The robot 100 and the terminal 300 may determine the present position by receiving signals transmitted from three transmission devices 200 and comparing the signals with each other. That is, three or more transmission devices 200 may be provided in the travel area 1000.

The robot 100 sets one certain point in the travel area 1000 as a reference position, and then, calculates a position while the robot 100 is moving as a coordinate. For example, an initial starting position, that is, a position of the charging apparatus 500 may be set as a reference position. Alternatively, a position of one of the plurality of transmission devices 200 may be set as a reference position to calculate a coordinate in the travel area 1000. The robot 100 may set an initial position of the robot 100 as a reference position in each operation, and then, determine a position of the robot 100 while the robot 100 is traveling. With reference to the reference position, the robot 100 may calculate a traveling distance based on rotation times and a rotational speed of the driving unit 11 that is a driving wheel, a rotation direction of the main body 10, etc. to thereby determine a present position in the travel area 1000. Even when the robot 100 determines a position of the robot 100 using the GPS satellite 400, the robot 100 may determine the position using a certain point as a reference position.

As shown in FIG. 3A and FIG. 3B, the robot 100 may determine a present position based on position information transmitted from the transmission device 200 or the GPS satellite 400. The position information may be transmitted in the form of a GPS signal, an ultrasound signal, an infrared signal, an electromagnetic signal, or an ultra-wideband (UWB) signal. A signal transmitted from the transmission device 200 may preferably be a UWB signal. Accordingly, the robot 100 may receive the UWB signal transmitted from the transmission device 200, and determine a present position based on the UWB signal. The transmission device 200 may also include the GPS module to transmit a GPS signal. In this case, the GPS signal transmitted from the transmission device 200 may be received by the GPS satellite 400. In addition, the GPS satellite 400 may transmit, to the robot 100, a result of receiving the GPS signal from the transmission device 200.

Figure 4:
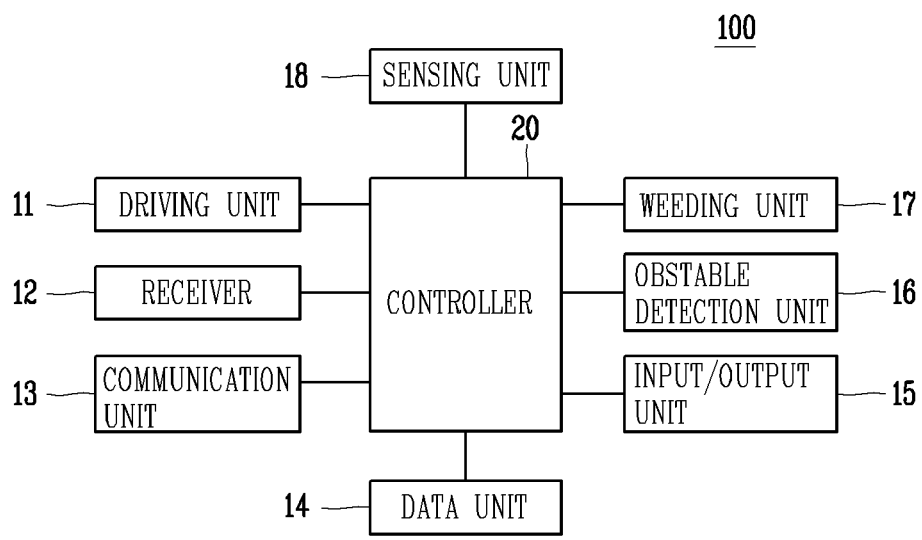
FIG. 4 is a detailed configuration diagram of the lawn mower robot according to the present disclosure.

As shown in FIG. 4, the robot 100 operating as described above includes the main body 10, the driving unit 11, the receiver 12, and the controller 20, and travel in the travel area 1000 based on the result of the reception by the receiver 12 and the prestored area map. Also, the robot 100 may further include at least one selected from a communication unit 13, a data unit 14, an input/output unit 15, an obstacle detection unit 16, a weeding unit 17, and a sensing unit 18.

The driving unit 11 may include a driving wheel included in a lower part of the main body 10, and may be rotationally driven to move the main body 10. That is, the driving unit 11 may be driven so that the main body 10 travels in the travel area 1000. The driving unit 11 may include at least one driving motor to move the main body 10 so that the robot 100 travels. For example, the driving unit 11 may include a left wheel driving motor for rotating a left wheel and a right wheel driving motor for rotating a right wheel.

The driving unit 11 may transmit information about a driving result to the controller 20, and receive a control command for operation from the controller 20. The driving unit 11 may operate according to the control command received from the controller 20. That is, the driving unit 11 may be controlled by the controller 20.

The receiver 12 may include a plurality of signal sensor modules that transmit or receive the position information. The receiver 12 may include a position sensor module that receives the signal transmitted from the transmission device 200. The position sensor module may transmit a signal to the transmission device 200. When the transmission device 200 transmits a signal using a method selected from an ultrasound method, a UWB method, and an infrared method, the receiver 12 may include a sensor module that transmits and receives an ultrasound signal, a UWB signal, or an infrared signal, in correspondence with this. The receiver 12 may include a UWB sensor. As a reference, UWB radio technology refers to technology using a very wide frequency range of several GHz or more in baseband instead of using a radio frequency (RF) carrier. UWB wireless technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the UWB sensor, the receiver 12 may receive very short pulses emitted by other UWB sensors.

When the robot 100 travels by following the terminal 300, the terminal 300 and the robot 100 respectively include the UWB sensor, and thus, transmit or receive a UWB signal with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, and thus, move by following the terminal 300. In this case, the terminal 300 operates as a transmitting side and the robot 100 operates as a receiving side. When the transmission device 200 includes the UWB sensor and transmits a signal, the robot 100 or the terminal 300 may receive the signal transmitted from the transmission device 200 through the UWB sensor included in the robot 100 or the terminal 300. At this time, a signaling method performed by the transmission device 200 may be identical to or different from signaling methods performed by the robot 100 and the terminal 300.

The receiver 12 may include a plurality of UWB sensors. When two UWB sensors are included in the receiver 12, for example, provided on left and right sides of the main body 10, respectively, the two USB sensors may receive signals, respectively, and compare a plurality of received signals with each other to thereby calculate an accurate position. For example, according to positions of the robot 100 and the transmission device 200 or the terminal 300, when a distance measured by a left sensor is different from a distance measured by a right sensor, relative positions of the robot 100 and the transmission device 200 or the terminal 300, and a direction of the robot 100 may be determined based on the measured distances.

The receiver 12 may transmit the reception result of the signal to the controller 20, and receive a control command for operation from the controller 20. The receiver 12 may operate according to the control command received from the controller 20. That is, the receiver 12 may be controlled by the controller 20.

The communication unit 13 may communicate with a communication device that is to communicate with the robot 100, using a wireless communication method. For example, the communication unit 13 may communicate with at least one selected from the transmission device 200, the terminal 300, and the GPS satellite 400. The communication unit 13 is connected to a predetermined network and may communicate with an external server or the terminal 300 that controls the robot 100. When the communication unit 13 communicates with the terminal 300, the communication unit 13 may transmit a generated map to the terminal 300, receive a command from the terminal 300, and transmit data regarding an operation state of the robot 100 to the terminal 300. The communication unit 13 may include a communication module such as wireless fidelity (Wi-Fi), wireless broadband (WiBro), or the like, as well as a short-range wireless communication module such as Zigbee, Bluetooth, or the like, to transmit and receive data. The communication unit 13 may communicate with the GPS satellite 400 via the terminal 300 that communicates with the GPS satellite 400. In addition. the communication unit 13 may further include a GPS module that transmits or receives a GPS signal to/from the GPS satellite 400 to communicate with the GPS satellite 400. When the communication unit 13 communicates with the GPS satellite 400, the GPS satellite 400 may receive a GPS signal transmitted from at least one transmission device 200 in the travel area 1000, and transmit a result of the reception of the GPS signal to the communication unit 13. That is, when the communication unit 13 communicates with the GPS satellite 400 that receives a GPS signal from the transmission device 200, the communication unit 13 may receive the result of the reception of the GPS signal from the GPS satellite 400.

The communication unit 13 may transmit information about a result of the communication to the controller 20, and receive a control command for operation from the controller 20. The communication unit 13 may operate according to the control command received from the controller 20. That is, the communication unit 13 may be controlled by the controller 20.

The data unit 14 is a storage element that stores data readable by a microprocessor, and may include a hard disk drive (HDD), a solid state disk (SSD), a silicon disk drive (SDD), a read only memory (ROM) a random access memory (RAM), CD-ROM, a magnetic tape, a floppy disk, or an optical data storage device. In the data unit 14, a received signal may be stored, reference data to determine an obstacle may be stored, and obstacle information regarding a detected obstacle may be stored. In the data unit 14, control data that controls operation of the robot 100, data according to an operation mode of the robot 100, collected position information, and information about the travel area 1000 and the boundary area 1200 may be stored.

The input/output unit 15 may include input elements such as at least one button, a switch, a touch pad, or the like, and output elements such as a display unit, a speaker, or the like to receive a user command and output an operation state of the robot 100.

The input/output unit 15 may transmit information about an operation state to the controller 20 and receive a control command for operation from the controller 20. The input/output unit 15 may operate according to a control command received from the controller 20. That is, the input/output unit 15 may be controlled by the controller 20.

The obstacle detection unit 16 includes a plurality of sensors to detect obstacles located in a traveling direction. The obstacle detection unit 16 may detect an obstacle located in front of the main body 10, that is, in a traveling direction of the main body 10 using at least one selected from a laser sensor, an ultrasonic sensor, an infrared sensor, and a three-dimensional (3D) sensor. The obstacle detection unit 16 may further include a cliff detection sensor installed on a rear surface of the main body 10 to detect a cliff.

In addition, the obstacle detection unit 16 may include a camera for detecting an obstacle by photographing a front. The camera is a digital camera, and may include an image sensor (not shown) and an image processing unit (not shown). The image sensor is a device that converts an optical image into an electrical signal. The image sensor includes a chip in which a plurality of photodiodes are integrated. A pixel may be an example of a photodiode. Charges are accumulated in respective pixels by an image formed on a chip by the light passing through the lens, and the charges accumulated in the respective pixels are converted into an electrical signal (for example, a voltage). A charge-coupled device (CCD) sensor and a complementary metal oxide semiconductor (CMOS) sensor are well known as image sensors. In addition, the camera may include an image processing unit (a digital signal processor (DSP)) for processing a captured image.

The obstacle detection unit 16 may transmit information about a result of the detection to the controller 20, and receive a control command for operation from the controller 20. The obstacle detection unit 16 may operate according to the control command received from the controller 20. That is, the obstacle detection unit 16 may be controlled by the controller 20.

The weeding unit 17 cuts grass on a bottom during traveling. The weeding unit 17 includes a brush or a blade that cuts a lawn, and may mow a law on the bottom through rotation.

The weeding unit 17 may transmit information about a result of operation to the controller 20 and receive a control command for operation from the controller 20. The weeding unit 17 may operate according to the control command received from the controller 20. That is, the weeding unit 17 may be controlled by the controller 20.

The sensing unit 18 may include at least one sensor that senses information about a posture and operation of the main body 10. The sensing unit 18 may include at least one selected from an inclination sensor that detects movement of the main body 10 and a speed sensor that detects a driving speed of the driving unit 11. The inclination sensor may be a sensor that senses posture information of the main body 10. When the inclination sensor is inclined forward, backward, leftward or rightward against the main body 10, the inclination sensor may sense the posture information of the main body 10 by calculating an inclined direction and an inclination angle. A tilt sensor, an acceleration sensor, or the like may be used as the inclination sensor. In a case of the acceleration sensor, any of a gyro type sensor, an inertial type sensor, and a silicon semiconductor type sensor may be used. In addition, various sensors or devices capable of detecting movement of the main body 10 may be used. The speed sensor may be a sensor for sensing a driving speed of a driving wheel in the driving unit 11. When the driving wheel rotates, the speed sensor may sense the driving speed by detecting rotation of the driving wheel.

The sensing unit 18 may transmit information about a sensing result to the controller 20, and receive a control command for operation from the controller 20. The sensing unit 18 may operate according to a control command received from the controller 20. That is, the sensing unit 18 may be controlled by the controller 20.

The controller 20 may include a central processing unit to control all operations of the robot 100. The controller 20 may determine a particular point in the travel area 1000 at which traveling of the main body 10 is limited, via the main body 10, the driving unit 11, the sensing unit 18, and the receiver 12, controls the main body 10 to travel in the travel area 1000 according to a result of the determination, and control functions/operations to be performed via the data unit 14, the input/output unit 15, the obstacle detection unit 16, the weeding unit 17, and the communication unit 13.

The controller 20 may control input/output of data and control the driving unit 11 so that the main body 10 travels according to settings. The controller 20 may independently control operations of the left wheel driving motor and the right wheel driving motor by controlling the driving unit 11 to thereby control the main body 10 to travel rotationally or in a straight line.

The controller 20 may set the boundary area 1200 of the travel area 1000 based on position information received from the terminal 300 or position information determined based on the signal received from the transmission device 200. The controller 20 may also set the boundary area 1200 of the travel area 1000 based on position information that is collected by the controller 20 during traveling. The controller 20 may set a certain area of a region formed by the set boundary area 1200 as the travel area 1000. The controller 20 may set the boundary area 1200 in a closed loop form by connecting discontinuous position information in a line or a curve, and set an inner area within the boundary area 1200 as the travel area 1000. When the travel area 1000 and the border area 1200 corresponding thereto are set, the controller 20 may control traveling of the main body 10 so that the main body 10 travels in the travel area 1000 and does not deviate from the set boundary area 1200. The controller 20 may determine the present position based on received position information and control the driving unit 11 so that the determined present position is located in the travel area 1000 to thereby control traveling of the main body 10.

In addition, according to obstacle information input by the obstacle detection unit 16, the controller 20 may control traveling of the main body 10 to avoid obstacles and travel. In this case, the controller 20 may reflect the obstacle information in prestored area information regarding the travel area 1000 to thereby modify the travel area 1000.

As the controller 20 determines a present position of the main body 10 based on at least one selected from the result of the reception by the receiver 12, a result of the communication by the communication unit 13, and the result of the sensing by the sensing unit 18, and controls the driving unit 11 so that the main body 10 travels in the travel area 1000 according to the determined position, the robot 100 having a configuration shown in FIG. 4 may travel in the travel area 1000.

While the robot 100 travels in the travel area 1000 shown in FIG. 1, the robot 100 may perform set operations. For example, while the robot 100 is traveling in the travel area 1000, the robot 100 may cut a lawn on a bottom of the travel area 1000.

In the robot 100, the main body 10 may travel according to driving of the driving unit 11. The main body 10 may travel as the driving unit 11 is driven to move the main body 10.

In the robot 100, the driving unit 11 may move the main body 10 according to driving of driving wheels. The driving unit 11 may move the main body 10 by driving the driving wheels so that the main body 10 may perform traveling.

In the robot 100, the receiver 12 may receive the signal transmitted from the at least one transmission device 200 provided in the travel area 1000, while the robot 100 is traveling. The at least one transmission device 200 may be provided in the travel area 1000 in a distributed manner. Three transmission devices 200 may be preferably provided in a distributed manner. While the main body 10 is traveling in the travel area 1000, the receiver 12 may receive the signal transmitted each of the at least one transmission device 200. That is, the receiver 12 may receive the signal from each of the at least one transmission device 200, and thus, receive a plurality of signals. While the main body 10 is traveling in the travel area 1000, the receiver 12 may receive the signal in real time. That is, the transmission device 200 may transmit the signal in real time, and the receiver 12 may receive the signal in real time during traveling. Thus, the receiver 12 may receive the signal each time when a position of the main body 10 is changed according to the traveling. Here, the signal may be transmitted from each of the at least one transmission device 200 in a predetermined form. In addition, as the signal is transmitted from a position in which the transmission device 200 is provided, that is, from a fixed position of the transmission device 200, a reception sensitivity of the signal may vary depending on a position of the main body 10. A reception result of the signal may vary depending on positions in which the signal is received. The robot 100 may determine a present position of the main body 10 based on the signal of which a reception result varies depending on reception positions of the signal. For example, when the main body 10 travels from one point to another point, a distance between the main body 10 and the at least one transmission device 200 is measured based on the reception result obtained while the main body 10 travels from the one point to the another point, and it is determined that the main body 10 moved from the one point to the another point based on the measured distance. Thus, a present position of the main body 10 may be determined.

The controller 20 in the robot 100 may determine a position of the main body 10 based on the result of the reception by the receiver 12 and the prestored area map in which an arrangement position of the at least one transmission device 200 is designated, and thus, control the driving unit 11 to thereby control traveling of the main body 10 so that the main body 10 travels in the travel area 1000. Here, the prestored area map is a map of the travel area 1000. The arrangement position of the transmission device 200 may be designated in the map, and the map may be prestored in the robot 100. For example, the map may be prestored in the data unit 14. The prestored area map may be pre-generated according to at least one selected from previous traveling history of the robot 100, a position of the at least one transmission device 200, and a user setting of the robot 100, and prestored in the robot 100. The controller 20 may measure an arrangement position of the transmission device 200 and a distance between the main body 10 and the transmission device 200 based on the reception result, and determine a present position of the main body 10 based on the measured distance. In addition, the controller 20 may measure a distance by which the main body 10 has traveled, based on at least one selected from the result of the communication by the communication unit 13 and the result of the sensing by the sensing unit 18, and determine a present position of the main body 10 based on the measured distance. The controller 20 may control driving of the driving unit 11 so that the main body 10 travels in the travel area 1000 according to the determined present position. That is, according to the determined present position, the controller 20 may control traveling of the main body 10 by controlling driving of the main body 10 so that a position of the main body 10 does not deviate from the boundary area 1200 while the main body 10 is traveling. The controller 20 may also control operation of the main body 10 so that the main body 10 performs set operation.

Figure 5A:
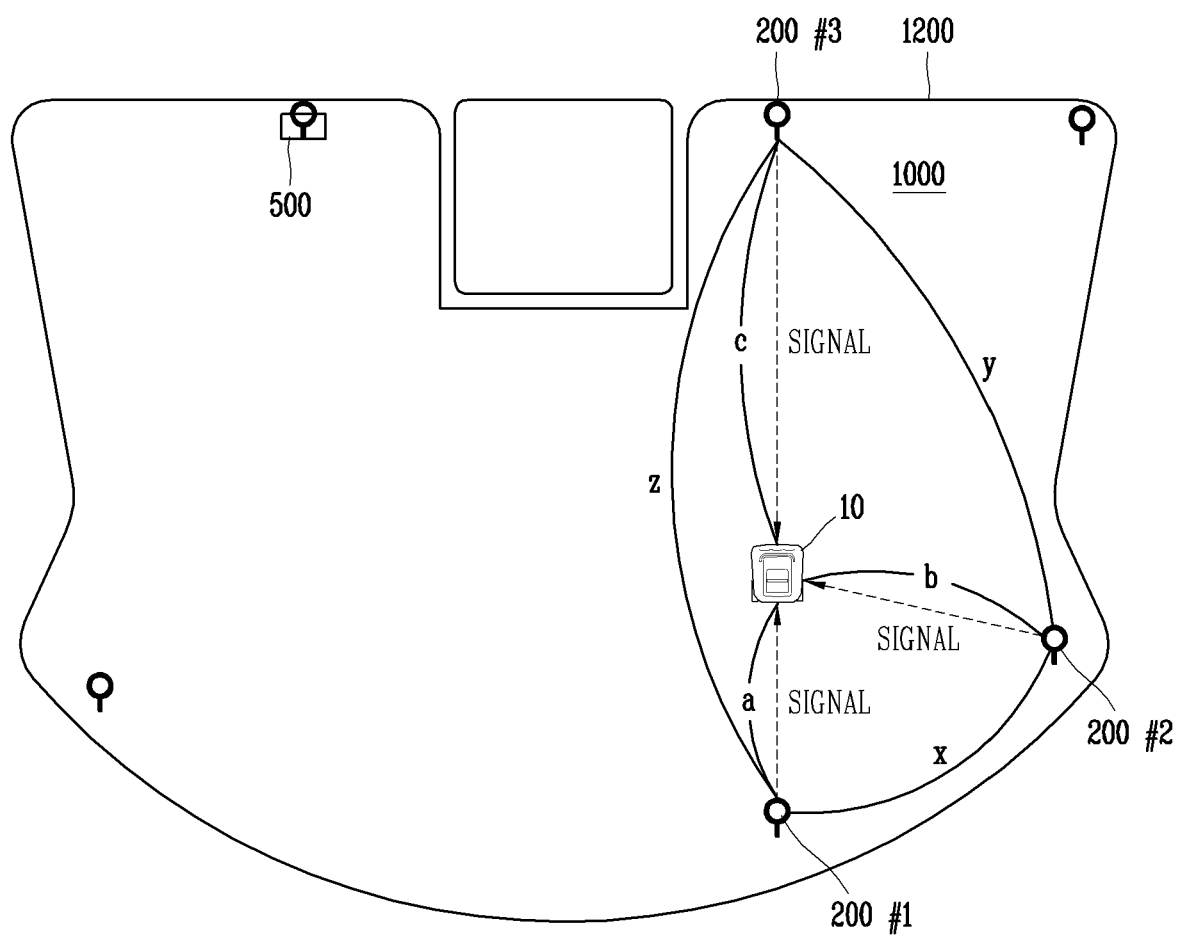
FIG. 5A is an exemplary view for explaining an example of a position change according to an embodiment of the lawn mower robot according to the present disclosure.
Figure 5B:
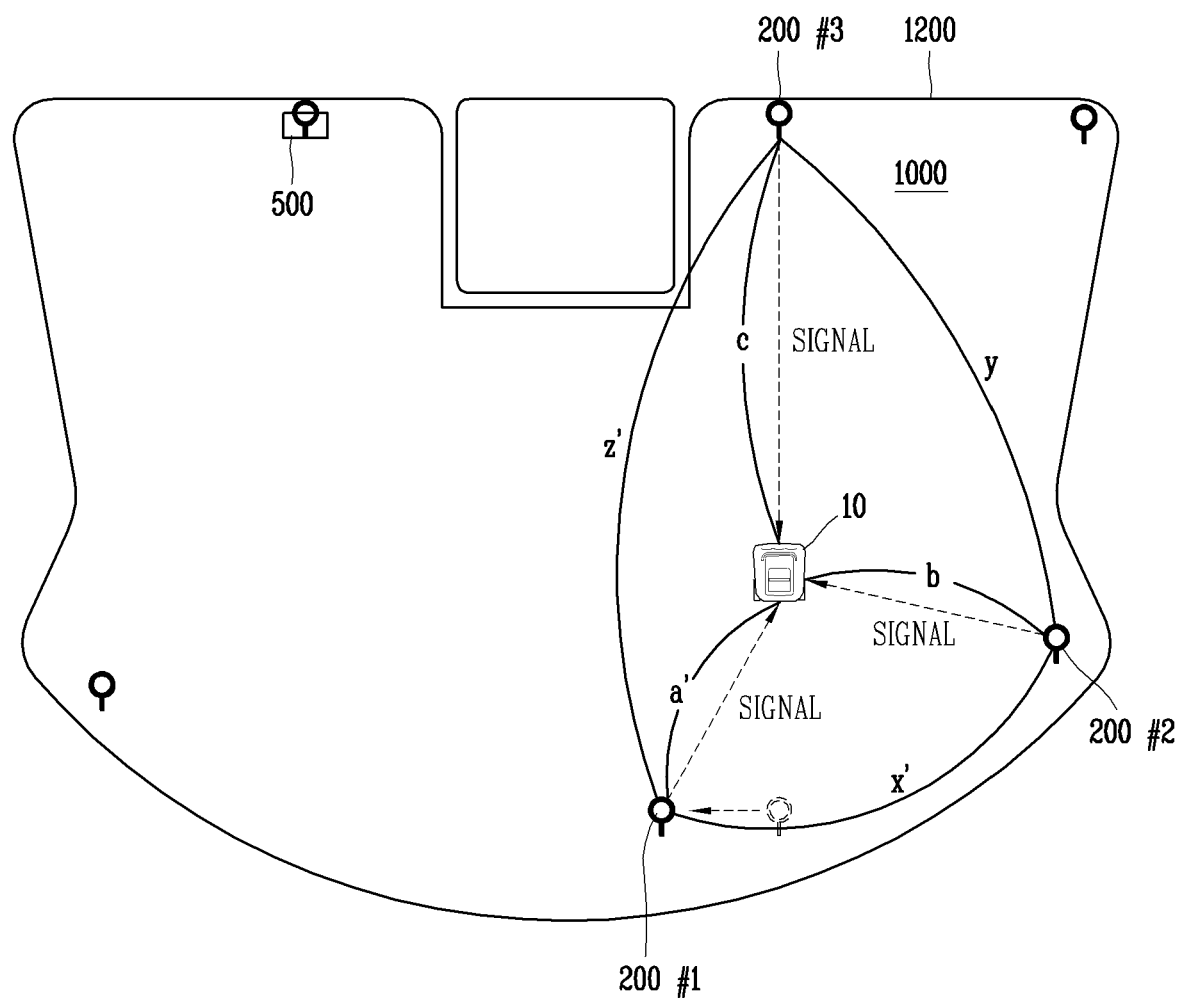
FIG. 5B is an exemplary view for explaining an example of a position change according to an embodiment of the lawn mower robot according to the present disclosure.

As such, the controller 20 controls traveling of the main body 10, detects a position change of the at least one transmission device 200 based on the reception result, and reflects a present position of the at least one transmission device 200 according to the position change in the prestored area map to thereby update the prestored area map. That is, the robot 100 not only determines a position of the main body 10 and a position of the at least one transmission device 200 based on the reception result of the signal transmitted from the at least one transmission device 200, but also updates the prestored area map according to a changed position by detecting a position change of the at least one transmission device 200. When a position of one transmission device 200 #1 among the transmission devices 200 in the travel area 1000 shown in FIG. 5A is changed a position shown in FIG. 5B, the controller 20 may detect position change of the one transmission device 200 #1 based on the reception result, and reflect a changed present position in the prestored area map. That is, when a position of the one transmission device 200 #1 among the at least one transmission device 200 shown in FIG. 5A is changed to a position shown in FIG. 5B, the controller 20 may detect a position change of the one transmission device 200 #1 based on the result of the reception of the signal from the transmission devices 200, and update the prestored area map according to a present position of the one transmission device 200 #1 of which position is changed.

The controller 20 may detect a position change of the at least one transmission device 200 based on the reception result and previous detection history at a reception position of the signal, determine a present positions of the at least one transmission device 200 based on the reception result, and reflect the present positions of the at least transmission device 200 in the prestored area map. The controller 20 may detect the position change of the at least one transmission device 200 based on a present reception result and detection history according to a previous reception result of the signal at a reception position of the signal, determine the present position of the at least one transmission device 200, and update the prestored area map. Here, the previous detection history is information about detection history according to the previous reception result at the reception position of the signal, and may be prestored in the robot 100.

A process of updating, by the controller 20, the prestored area map by detecting the position change of the at least transmission devices 200 may be performed as shown in FIG. 6. As shown in FIG. 6, when the receiver 12 receives the signal transmitted from the at least one transmission device 200 (P10), the controller 20 may detect a position change of the at least one transmission device 200 (P21 to P40) based on the result of the reception by the receiver 12 and the previous detection history at a reception position of the signal and determine the present position of the at least one transmission devices 200 (P50) based on the reception result, and thus, reflect the present position of the at least one transmission device 200 in the prestored area map (P60).

The controller 20 may analyze a reception sensitivity of the signal based on the reception result (P21), and thus, detect a position change of the transmission devices 200 according to a result of the analysis and the previous detection history (P31 to P40). Here, the reception sensitivity may include at least one of reception receptivity, reception time, and a reception direction of the signal. Accordingly, the controller 20 may analyze at least one selected from the reception receptivity, the reception time, and the reception direction of the signal based on the reception result. The controller 20 may analyze the reception sensitivity of the signal based on the reception result (P21), and detect the position change of the at least one transmission device 200 (P31 to P40) according to a result of comparing a result of the analysis with analysis history included in the previous detection history. The analysis history may include previously determined reception sensitivity. The controller 20 may detect the position change of the at least one transmission device 200 (P40) according to a result of comparing a present reception sensitivity of the signal with a previous reception sensitivity of the signal (P31). When the analysis result is different from the analysis history (P31), the controller 20 may detect the position change of the at least one transmission device 200 (P40). That is, when the present reception sensitivity at the reception position of the signal does not match the previous reception sensitivity, the controller 20 may determine that the present reception sensitivity does not match the previous reception sensitivity due to the position change of the transmission device 200, and thus, detect that a position of the at least one transmission device 200 is changed (P40). For example, when the position of the one transmission device 200 #1 among the transmission devices 200 shown in FIG. 5A is changed to the position shown in FIG. 5B, as the position of the one transmission device 200 #1 changes from a position (a) to a position (a'), a distance for which a signal transmitted from the one transmission device 200 #1 to the main body 10 is changed from a distance (a) to a distance (a'). Accordingly, since reception receptivity of the signal transmitted from the one transmission device 200 #1 changes in correspondence with a distance according to a distance changed from the distance (a) to the distance (a'), a position change of the one transmission device 200 #1 may be detected from a difference between the present reception receptivity and the previous reception receptivity. That is, since previous reception receptivity obtained as a result of transmitting, by the one transmission device 200 #1, a signal at the position (a) is different from present reception receptivity obtained as a result of transmitting, by the one transmission device 200 #1, a signal at the position (a') according to a change of a position, it may be detected that the position of the one transmission device 200 #1 is changed from the position (a) to the position (a'). When the analysis result is not different from the analysis history (P31), the controller 20 may not detect a position change of the at least one transmission device 200 (P70). That is, when the present reception sensitivity at the reception position of the signal matches the previous reception sensitivity, the controller 20 may determine that the present reception sensitivity matches the previous reception sensitivity due to non-change of a position of the transmission device 200, and thus, detect that the position of the at least one transmission device 200 is not changed (P70).

In addition, when two or more transmission devices 200 are included, the controller 20 may measure a distance between the at least one transmission device 200 based on the reception result (P22), and thus, detect a position change of the at least one transmission device 200 according to a result of the measurement and the previous detection history (P32 to P40). Here, the distance between the at least one transmission device 200 may be a distance between two transmission devices 200, and may be measured based on a distance between the main body 10 and the at least one transmission devices 200. Accordingly, the controller 20 may measure the distance between the main body 10 and the at least one transmission device 200 based on the reception result, and calculate the distance between the transmission devices 200 based on the measured distance between the main body 10 and the transmission devices 200. The controller 20 may measure the distance between the transmission devices 200 based on the reception result (P22), and detect a position change of the at least one transmission device 200 (P32 to P40) according to a result of comparing a result of the measurement with measurement history included in the previous detection history. The measurement history may include previously measured distances. The controller 20 may detect the position change of the at least one transmission device 200 (P40) according to the result (P32) of the comparison of a present distance between the transmission devices 200 with a previous distance between the transmission devices 200. When the measurement result is different from the measurement history (P32), the controller 20 may detect the position change of the at least one transmission device 200 (P40). That is, when the present distance between the transmission devices at a reception position of the signal does not match the previous distance therebetween, the controller 20 may determine that the present distance between the transmission devices 200 does not match the previous distance therebetween due to the position change of the transmission devices 200, and thus, detect that positions of the transmission devices 200 are changed (P40). For example, when the position of the one transmission device 200 #1 among the transmission devices 200 shown in FIG. 5A changes to the position shown in FIG. 5B, as the position of the one transmission device 200 #1 changes from the position (a) to the position (a'), a distance between the main body 10 and the one transmission device 200 #1 changes from the distance (a) to the distance (a'). Accordingly, since distances between the one transmission device 200 #1 and other neighboring transmission devices 200 #2 and 200 #3 change in correspondence with a distance according to a distance changed from the distance (a) to the distance (a') (#1-#2: x→x', #1-#3: z→z'), the position change of the one transmission device #1 may be detected from a difference between a present distance between the transmission devices and a previous distance between the transmission devices 200. That is, as a position of the transmission device 200 #1 changes from the position (a) to the position (a'), a distance between the one transmission device 200 #1 and one neighboring transmission device 200 #2 changes from a distance (x) to a distance (x'), and a distance between the one transmission device 200 #1 and another neighboring transmission device 200 #3 changes from a distance (z) to a distance (z'), a present distance between the transmission devices 200 is different from a previous distance between the transmission devices 200 according to a distance changed from the position (a) to the position (a'). Thus, a position change of the one transmission device 200 #1 from the distance (a) to the distance (a') may be detected. When the measurement result is not different from the measurement history (P32), the controller 20 may detect the position change of the transmission devices 200 (P70). That is, when a present distance between the transmission devices at a reception position of the signal matches a previous distance therebetween, the controller 20 may determine that the present distance between the transmission devices 200 matches the previous distance therebetween due to non-change of positions of the transmission devices 200, and thus, detect that the positions of the transmission devices 200 are not changed (P70).

In addition, the controller 20 may extract posture information of the transmission devices 200 included in the signal based on the reception result, and thus, detect position states of the transmission devices 200. Thus, according to a result of the detection and the previous detection history, the controller 20 may detect a position change of the transmission devices 200 (P33 to P40). Here, the posture information of the transmission devices 200 is a result of detecting, by the IMU sensor in the transmission devices 200, a posture such as an inclination of the transmission devices 200. The posture information of the transmission devices 200 may be included in the signal when the transmission devices 200 transmit the signal. Accordingly, the controller 20 may extract the posture information included in the signal based on the reception result, and detect attitude states of the transmission devices 200 based on the posture information. The controller 20 may detect posture states of the transmission devices 200 (P23) by extracting posture information of the transmission devices 200 included in the signal based on the reception result. Then, according to a result of comparing a result of the detection with detection history included in the previous detection history, the controller 20 may detect the position change of the transmission devices 200 (P33 to P40). The detection history may include posture detection history. The controller 20 may detect the position change of the transmission devices 200 (P40) according to a result (P33) of comparing present posture states of the transmission devices 200 with previous posture states of the transmission devices 200. When the detection result is different from the detection history (P33), the controller 20 may detect position change of the transmission devices 200 (P40). That is, when present posture states of the transmission devices 200 at a reception position of the signal does not match previous posture states thereof, the controller 20 may determine that the present posture states of the transmission devices 200 do not match the previous posture states thereof due to the position change of the transmission devices 200, and thus, detect that positions of the transmission devices 200 are changed (P40). For example, when a position of the one transmission device 200 #1 among the transmission devices 200 shown in FIG. 5A changes to a position shown in FIG. 5B, as a position of the one transmission device 200 #1 changes from the position (a) to the position (a'), a posture state of the one transmission device 200 #1 is changed. Thus, a position change of the one transmission device 200 #1 may be detected from a difference between the present posture states of the transmission devices 200 and the previous posture states thereof. That is, as the position of the one transmission device 200 #1 is changed from the position (a) to the position (a'), a posture such as an inclination of the one transmission device 200 #1, etc. changes from a posture according to a terrain of the position (a) to a posture according to a terrain of the position (a'), and thus, the posture states of the transmission devices 200 at the present position (a') is different from the posture states of the transmission devices 200 at the previous position (a). Accordingly, a position change of the one transmission device 200 #1 from the distance (a) to the distance (a') may be detected. When the detection result is not different from the detection history (P33), the controller 20 may not detect position change of the transmission devices 200 (P70). That is, when present posture states of the transmission devices 200 at a reception position of the signal match previous posture states thereof, the controller 20 may determine that the present posture states of the transmission devices 200 match the previous posture states thereof due to non-changes of positions of the transmission devices 200, and thus, detect that positions of the transmission devices 200 are not changed (P70).

As such, when the controller 20 for detecting position change of the transmission devices 200 detects position change of the transmission devices 200 (P40), the controller 20 may determine present positions of the transmission devices based on the reception result (P50), and reflect a result of the determination in the prestored area map (P60). That is, after the controller 20 detects the position change of the transmission devices 200 (P40), the controller 20 determines the present position of the transmission devices 200 based on the reception result (P50) and reflects the present positions of the transmission devices 200 in the prestored area map (P60) to thereby update the prestored area map. In this case, the controller 20 may determine the present positions of the transmission devices 200 based on at least one selected from a reception sensitivity of the signal, the distances between the main body 10 and the transmission devices 200, and the distances between the transmission devices 200. For example, the present positions of the transmission devices 200 may be determined by combining a result of the determination based on the reception sensitivity of the signal and a result of the determination based on the distance between the transmission devices 200. Accordingly, the prestored area map may be updated to reflect a result of the position change of the transmission devices 200, that is, present positions of the transmission devices 200. Also, when the controller 20 does not detect position change of the transmission devices 200 (P70), the controller 20 may maintain the prestored area map (P80). That is, when the positions of the transmission device 200 is changed, the prestored area map may be updated according to the changed positions, that is, the present positions.

In addition, the controller 20 may determine present positions of the transmission devices 200 based on the reception result, detect position change of the transmission devices 200 according to a result of comparing a result of the determination with the prestored area map, and thus, reflect the present positions of the transmission devices 200 in the area map. That is, the controller 20 may determine the present positions of the transmission devices 200 based on the reception result, detect position changes of the transmission devices 200 according to a result of comparing the determined present positions with arrangement positions designated in the prestored area map, and update the prestored area map according to the present positions of the transmission devices 200.

Here, the controller 20 may determine at least one of appropriateness of the present positions of the transmission devices 200 and appropriate positions of the transmission devices 200, based on the reception result. When the signal is received from the transmission devices 200 of which positions are changed, the controller 20 may analyze the reception sensitivity based on the reception result, and determine appropriateness of the present positions of the transmission devices 200 according to a result of the analysis. For example, when the reception intensity of the signal is less than a predetermined intensity criterion, it is determined that the present positions of the transmission devices 200 are inappropriate. When the reception intensity of the signal is equal to or greater than the predetermined intensity criterion, it is determined that the present positions of the transmission devices 200 are appropriate. When the signal is received from the transmission devices 200 of which positions are changed, the controller 20 may analyze the reception sensitivity based on the reception result, and determine appropriate positions of the transmission devices 200 according to a result of the analysis. For example, a position at which a reception intensity of the signal is equal to or greater than the intensity criterion may be selected and determined as the appropriate position. In this case, the controller 20 may display information regarding a result of the determination on outside of the robot 100. Accordingly, the determination result may be provided to a user of the robot 100 to guide the transmission devices 200 to an optimum position.

Figure 7:
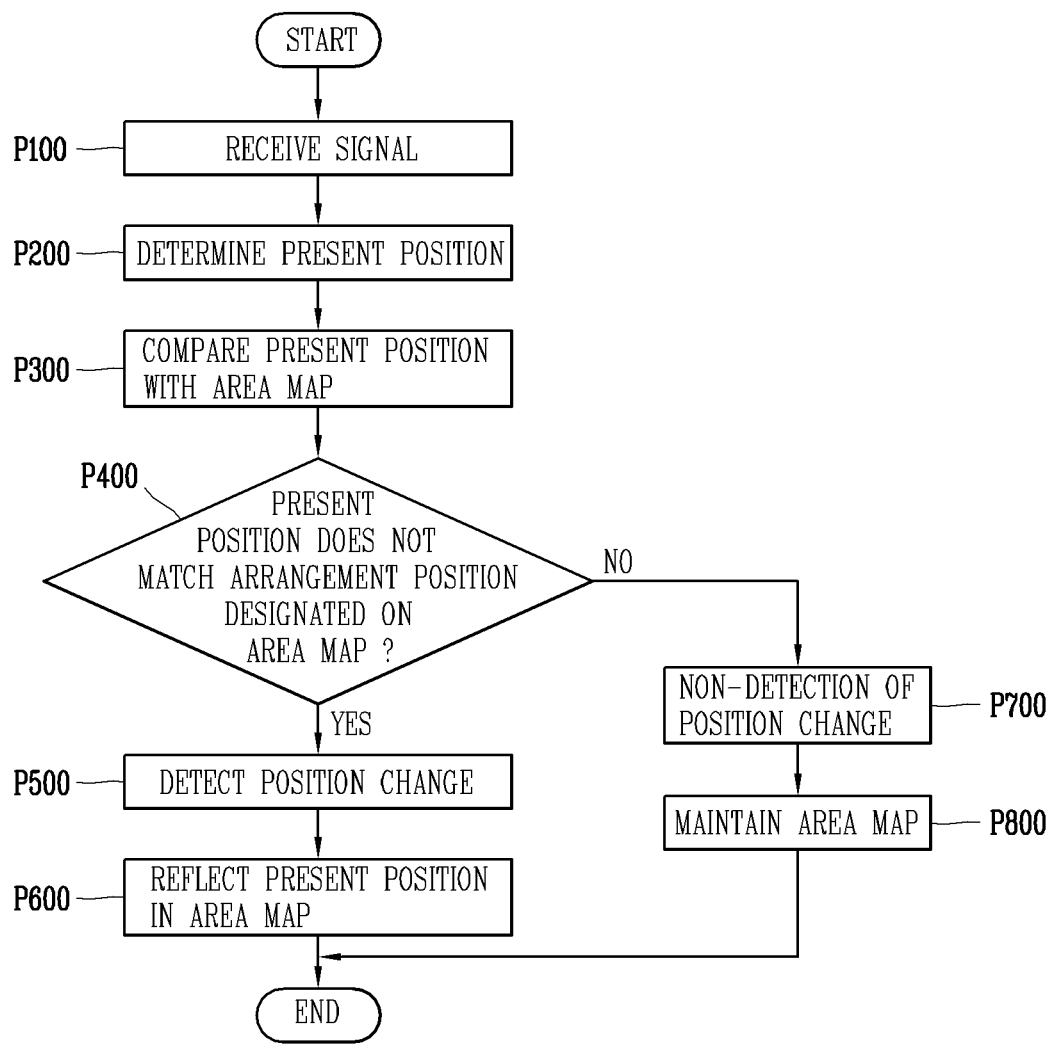
FIG. 7 is a flowchart illustrating a process of detecting a position change according to an embodiment of the lawn mower robot according to the present disclosure.

A process in which the controller 20 updates the prestored area map by detecting the position change of the transmission devices 200 may be performed in a sequence shown in FIG. 7. As shown in FIG. 7, when the receiver 12 receives the signal transmitted from the transmission device 200 (P100), the controller 20 may determine present positions of the transmission devices 200 based on a result of the reception by the receiver 12 (P200), detect position changes of the transmission devices 200 (P400 and P500) according to a result of comparing the determined present positions with the prestored area map (P300), and thus, reflect the present positions of the transmission devices 200 in the prestored area map (P600). The controller 20 may analyze a reception sensitivity of the signal based on the reception result and determine the present positions of the transmission devices 200 based on a result of the analysis (P200). The controller 20 may also measure a distance between the transmission devices 200 based on the reception result and determine the present positions of the transmission devices 200 based on a result of the measurement (P200). The controller 20 may determine the present positions of the transmission devices 200 (P200) and compare the determined present positions of the transmission devices 200 with arrangement positions designated in the prestored area map (P300). As a result of the comparison, when the present positions of the transmission devices 200 do not match the arrangement positions, the controller 20 may detect position changes of the transmission devices 200 (P500). That is, when positions of the transmission devices 200 change from the arrangement positions designated in the prestored area map to the present positions determined according to the reception result, the present positions of the transmission devices 200 do not match the arrangement positions due to position changes of the transmission devices 200. Thus, position change of the transmission devices 200 may be detected. That is, after the controller 20 detects the position change of the transmission devices 200 (P500), the controller 20 may reflect the present positions of the transmission devices 200 in the prestored area map (P600) to thereby update the prestored area map. The controller 20 may determine the present positions of the transmission devices 200 (P200) and compare the determined present positions of the transmission devices 200 with arrangement positions designated in the prestored area map (P300). As a result of the comparison, when the present positions of the transmission devices 200 match the arrangement positions, position changes of the transmission devices 200 may not be detected (P700). In this case, the controller 20 may maintain the prestored area map (P800) by non-updating the prestored area map.

As such, the robot 100 may detect position change of the transmission devices 200 based on the reception result to thereby update the prestored area map according to changed positions. Thus, accurate position recognition/traveling may be performed according to the area map in which the present positions of the transmission devices 200 are reflected.

The robot 100 may be implemented in another embodiment as follows.

As shown in FIG. 1B, the robot 100 includes the main body 10, the driving unit 11, the communication unit 13, and the controller 20, wherein the driving unit 11 moves the main body 10, the communication unit 13 receives delivery of a reception result of a signal by communicating with a communication device 400 that receives a signal transmitted from the at least one transmission device 200 in the travel area 1000, and the controller 20 controls traveling of the main body 10 by controlling the driving unit 11 based on the reception result and a prestored area map in which an arrangement position of the at least one transmission device 200 is designated.

As such, in the robot 100 including the driving unit 11, the communication unit 13, and the controller 20, the controller 20 determines a present position of the at least one transmission device 200 based on the reception result, detects a position change of the at least one transmission device 200 based on a result of comparing a result of the determination with the prestored area map, and thus, updates the prestored area map by reflecting the present position of the at least one transmission device 200 in the prestored area map. That is, the robot 100 may detect a position change of the at least one transmission device 200 based on a result of communication by the communication unit 13 that communicates with the communication device 400. Here, the signal may be a GPS signal, and the communication device 400 may be a GPS satellite 400. That is, the at least one transmission device 200 may include a GPS module to transmit the GPS signal, and the GPS satellite 400 may receive the GPS signal transmitted from the at least one transmission device 200, and transmit a result of the reception to the communication unit 13. Accordingly, the controller 20 may determine the present positions of the at least one transmission devices 200 based on the reception result of the GPS signal transmitted from the communication device 400, and detect a position change of the at least one transmission device 200 according to the determined present position of the at least one transmission device 200. A process of detecting the position change of the at least one transmission device 200 via the GPS signal may be shown in FIG. 7.

When the communication device 400 receives the GPS signal transmitted from the at least one transmission device 200 (P100) and transmits a result of the reception to the communication unit 13, the controller 20 may determine a present position of the at least one transmission device 200 based on the transmitted GPS signal (P200). The controller 20 may determine the present position of the at least one transmission device 200 based on position information of the at least one transmission device 200 included in the GPS signal (P200), compare the determined present position of the at least one transmission device 200 with an arrangement position of the at least one transmission device 200 designated in the prestored area map, and detect a position change of the at least one transmission device 200 (P400 and P500) according to a result of the comparison. The controller 20 may determine the present position of the at least one transmission device 200 (P200) and compare the determined present positions of the at least one transmission device 200 with an arrangement position designated in the prestored area map (P300). As a result of the comparison, when the present position of the at least one transmission device 200 does not match the arrangement position, a position change of the at least one transmission device 200 may be detected (P500). That is, after the controller 20 detects the position change of the transmission devices 200 (P500), the controller 20 may reflect the present position of the at least one transmission device 200 in the prestored area map (P600) to thereby update the prestored area map. The controller 20 may determine the present position of the at least one transmission device 200 (P200) and compare the determined present positions of the at least one transmission device 200 with the arrangement position designated in the prestored area map (P300). As a result of the comparison, when the present positions of the transmission devices 200 match the arrangement position, a position change of the at least one transmission device 200 may not be detected (P700). In this case, the controller 20 may maintain the prestored area map by non-updating the prestored area map (P800).

In addition, the robot 100 may be implemented in a combination of the above-described embodiments as follows.

As shown in FIG. 1B, the robot 100 includes the main body 10, the driving unit 11, the receiver 12, the communication unit 13, and the controller 20, wherein the driving unit 11 moves the main body 10, the receiver 12 receives a first signal transmitted from the at least one transmission device 200 in the travel area 1000, the communication unit 13 receives delivery of the reception result of the signal by communicating with the communication device 400 that receives a second signal transmitted from the at least one transmission device 200 in the travel area 1000, and the controller 20 controls traveling of the main body 10 by controlling the driving unit 11 so that the main body 10 travels in the travel area 1000, based on at least one selected from the result of the reception by the receiver 12 and a result of the communication with the communication unit 13, and a prestored area map in which an installation position of the at least one transmission device 200 is designated.

As such, in the robot 100 including the main 10, the driving unit 11, the receiver 12, the communication unit 13, and the controller 20, the controller 20 may determine a present position of the at least one transmission device 200 based on at least one selected from the reception result and the communication result, detect a position change of the at least one transmission device 200 based on a result of comparing the determined present position with a present position designated in the prestored area map, and thus, update the prestored area map by reflecting the present position in the prestored area map. That is, the robot 100 may detect a position change of the at least one transmission device 200 using at least one selected from a result of receiving the first signal through the receiver 12 and a result of the communication with the communication device 400 that receives the second signal. Here, the first signal may be a UWB signal transmitted from at least one the transmission device 200 and received by the receiver 12, and the second signal may be a GPS signal transmitted from the at least one transmission device 200 to the communication device 400. That is, the at least one transmission device 200 may include a GPS module to transmit the GPS signal, and the GPS satellite 400 may receive the GPS signal transmitted from the at least one transmission device 200, and transmits a result of the reception to the communication unit 13. Accordingly, the at least one transmission device 200 may transmit the first signal and the second signal, and the robot 100 may receive the first signal through the receiver 12, and receive delivery of a result of the reception of the second signal through the GPS satellite 400. In addition, the controller 20 may determine a present position of the at least one transmission device 200 based on at least one selected from the reception result of the first signal through the receiver 12 and the reception result of the second signal transmitted from the communication device 400, and thus, detect a position change of the at least one transmission device 200 based on the determined present position of the at least one transmission device 200.

The above-described embodiments of the robot 100 may be applied to a lawn mower robot system and a control method of a lawn mower robot system that are to be described later. In addition, embodiments of the lawn mower robot system and the control method of the lawn mower robot system may be applied to the robot 100.

Hereinafter, a lawn mower robot system (hereinafter referred to as a system) according to the present disclosure will be described.

As shown in FIG. 3A and FIG. 3B, the system 1 may be a system including the robot 100 that cuts a lawn in the travel area 1000, and an element that communicates with the robot 100. Here, the robot 100 may be the robot 100 described above. That is, the system 1 may be a traveling/control/operation system of a lawn mower robot that cuts a lawn in the travel area 1000.

The system 1 includes a plurality of transmission devices 200, the communication device 400, and the robot 100, wherein the plurality of transmission devices 200 are provided in the traveling area 1000 to thereby transmit first and second signals for determining position information, the communication device 400 receives the second signal and transmits a result of the reception to a lawn mower robot, and the robot 100 receives the first signal, receives delivery of a result of the reception of the second signal from the communication device 400, and thus, performs a set operation while the robot 100 travels in the travel area 1000, based on at least one selected from a first reception result of the first signal and a second reception result of the second signal and a prestored area map in which arrangement positions of the plurality of transmission devices 200 are designated. Here, the first signal may be a UWB signal of which reception result varies depending on a receiving position, and the second signal may be a GPS signal.

In the system 1, a plurality of the transmission devices 200 may be included. At least three transmission devices 200 may be provided in a distributed manner. The plurality of transmission devices 200 may include a UWB module for transmitting the first signal and a GPS module for transmitting the second signal. Accordingly, the plurality of transmission devices 200 may transmit the first signal to the robot 100 through the UWB module, and transmit the second signal to the communication device 400 through the GPS module. At least one of the transmission devices 200 may further include an IMU sensor for detecting a posture state.

In the system 1, the communication device 400 may be a GPS satellite. The communication device 400 may receive the second signal transmitted from the plurality of transmission devices 200 and transmit, to the robot 100, the second reception result that is a result of receiving the second signal.

In the system 1, the robot 100 detects position changes of the plurality of transmission devices 200 based on at least one of the first reception result and the second reception result, and thus, reflect, in the area map, a present position of the plurality of transmission devices 200 according to the position changes. That is, the robot 100 may detect the position changes of the plurality of transmission devices 200 based on the reception result of at least one of the first and second signals transmitted from the transmission device 200. Then, the robot 100 may reflect, in the prestored area map, the present positions of the plurality of transmission devices 200 according to the position changes to thereby update the prestored area map.

As shown in FIG. 1B, the robot 100 may include the main body 10, the driving unit 11, the receiver 12, the communication unit 13, and the controller 20, wherein the driving unit 11 moves the main body 10, the receiver 12 receives the first signal, the communication unit 13 receives delivery of the second reception result by communicating with the communication device 400 that receives the second signal, and the controller 20 controls traveling of the main body 10 by controlling the driving unit 11 so that the main body 10 travels in the travel area 1000, based on at least one selected from the first reception result and the second reception result, and the prestored area map. That is, the robot 100 may detect position changes of the plurality of transmission devices 200 using at least one selected from the first reception result of the first signal through the receiver 12 and the second reception result delivered via the communication unit 13 from the communication device 400 that receives the second signal.

In the system 1, the robot 100 may detect position changes of the plurality of transmission devices 200 based on the first reception result and previous detection history at a reception position of the first signal, determine present positions of the plurality of transmission devices 200 based on at least one selected form the first reception result and the second reception result, and thus, reflect the present positions of the plurality of transmission devices 200 in the prestored area map. That is, the robot 100 may detect position changes of the plurality of transmission devices 200 based on the first reception result and previous detection history at a reception position of the first signal, determine present positions of the plurality of transmission devices 200 based on at least one selected from the first reception result and the second reception result, and thus, update the prestored area map. Here, the previous detection history is information about detection history according to a previous reception result at the reception position of the first signal, and may be prestored in the robot 100.

When the robot 100 receives the first signal transmitted from the plurality of transmission devices 200, the robot 100 may detect position changes of the plurality of transmission devices 200 based on the first reception result and the previous detection history at the reception position of the first signal, determine present positions of the plurality of transmission devices 200 based on the reception result of the first signal, and thus, reflect the present positions of the plurality of transmission devices 200 in the prestored area map.

The robot 100 may analyze a reception sensitivity of the first signal based on the first reception result, and detect position changes of the plurality of transmission devices 200 according to a result of comparing a result of the analysis with analysis history included in the previous detection history. That is, the robot 100 may detect the position changes of the plurality of transmission devices 200 according to a result of comparing a present reception sensitivity of the first signal with a previous reception sensitivity of the first signal. When the analysis result is different from the analysis history, the robot 100 may detect position changes of the plurality of transmission devices 200. That is, when the present reception sensitivity at the reception position of the signal does not match the previous reception sensitivity, the robot 100 may determine that the present reception sensitivity does not match the previous reception sensitivity due to position change of the plurality of transmission devices 200, and thus, detect that positions of the plurality of transmission devices 200 are changed. When the analysis result is not different from the analysis history, the robot 100 may not detect position changes of the plurality of transmission devices 200. That is, when the present reception sensitivity at the reception position of the first signal matches the previous reception sensitivity, the robot 100 may determine that the present reception sensitivity matches the previous reception sensitivity due to non-changes of positions of the plurality of transmission devices 200, and thus, detect that positions of the plurality of transmission devices 200 are not changed.

In addition, the robot 100 may measure the distance between the transmission devices 200 based on the first reception result, and detect position changes of the plurality of transmission devices 200 according to a result of comparing a result of the measurement with measurement history included in the previous detection history. That is, the robot 100 may detect the position changes of the plurality of transmission devices 200 according to a result of comparing a present distance between the plurality of transmission devices 200 with a previous distance between the plurality of transmission devices 200. When the measurement result is different from the measurement history, the robot 100 may detect position changes of the plurality of transmission devices 200. That is, when a present distance between the plurality of transmission devices 200 at a reception position of the first signal does not match a previous distance therebetween, the robot 100 may determine that the present distance between the transmission devices 200 does not match the previous distance therebetween due to position changes of the plurality of transmission devices 200, and thus, detect that positions of the transmission devices 200 are changed. When the measurement result is not different from the measurement history, the robot 100 may not detect position changes of the plurality of transmission devices 200. That is, when a present distance between the plurality of transmission devices 200 at a reception position of the first signal matches a previous distance therebetween, the robot 100 may determine that the present distance between the plurality of transmission devices 200 matches the previous distance therebetween due to non-change of positions of the plurality of transmission devices 200, and thus, detect that the positions of the transmission devices 200 are not changed.

The robot 100 may extract posture information of the plurality of transmission devices 200 included in the signal based on the first reception result, and thus, detect posture states of the transmission devices 200, Then, according to a result of comparing a result of the detection with detection history included in the previous detection history, the controller 20 may detect the position change of the transmission devices 200. That is, the robot 100 may detect position changes of the plurality of transmission devices 200 according to a result of comparing present posture states of the plurality of transmission devices 200 with previous posture states of the plurality of transmission devices 200. When a result of the detection is different from the detection history, the robot 100 may detect position changes of the plurality of transmission devices 200. That is, when present posture states of the plurality of transmission devices 200 at a reception position of the first signal do not match previous posture states thereof, the robot 100 may determine that the present posture states of the plurality of transmission devices 200 do not match the previous posture states thereof due to position changes of the plurality of transmission devices 200, and thus, detect that positions of the transmission devices 200 are changed. When the detection result is not different from the detection history, the robot 100 may not detect position changes of the plurality of transmission devices 200. That is, when present posture states of the plurality of transmission devices 200 at a reception position of the first signal do not match previous posture states thereof, the robot 100 may determine that the present posture states of the transmission devices 200 match the previous posture states thereof due to non-change of positions of the plurality of transmission devices 200, and thus, detect that positions of the plurality of transmission devices 200 are not changed.

As such, when the robot 100 for detecting position changes of the plurality of transmission devices 200 detects position changes of the plurality of transmission devices 200, the robot 100 may determine present positions of the plurality of transmission devices 200 based on at least one selected from the first reception result and the second reception result to thereby reflect a result of the determination in the prestored area map. That is, after the robot 100 detects position changes of the plurality of transmission devices 200, the robot 100 may determine present positions of the plurality of transmission devices 200 based on at least one of the first reception result and the second reception result, and reflect the present positions of the plurality of transmission devices 200 in the prestored area map to thereby update the prestored area map. In this case, the robot 100 may determine the present positions of the plurality of transmission devices 200 based on at least one selected from a reception sensitivity of the signal according to the first reception result, the distances between the main body 10 and the plurality of transmission devices 200, and the distances between the transmission devices 200. For example, the present positions of the transmission devices 200 may be determined by combining a result of the determination based on the reception sensitivity of the first signal with a result of the determination based on the distance between the plurality of transmission devices 200. Alternatively, the present locations of the plurality of transmission devices 200 may be determined based on the second reception result that is a result of receiving the GPS signal. Thus, the present positions of the plurality of transmission devices 200 may be determined by combining a result of the determination based on the first reception result with a result of the determination based on the second reception result. Accordingly, the prestored area map may be updated to reflect a result of changing positions of the transmission devices 200, that is, present positions of the plurality of transmission devices 200. Also, when the robot 100 does not detect position changes of the plurality of transmission devices 200, the robot 100 may maintain the prestored area map. That is, when the position of the plurality of transmission device 200 is changed, the prestored area map may be updated according to changed present positions.

In addition, the robot 100 may determine the present positions of the plurality of transmission devices 200 based on at least one selected from the first reception result and the second reception result, detect position changes of the plurality of transmission devices 200 according to a result of comparing a result of the determination with the prestored area map, and thus, reflect the present positions of the plurality of transmission devices 200 in the prestored area map. That is, the robot 100 may determine the present positions of the plurality of transmission devices 200 based on at least one selected from the first reception result and the second reception result, detect position changes of the plurality of transmission devices 200 according to a result of comparing the determined present positions with arrangement positions designated in the prestored area map, and update the prestored area map according to the present positions of the plurality of transmission devices 200.

When the robot 100 receives the first signal transmitted from the plurality of transmission devices 200, the robot 100 may determine present positions of the plurality of transmission devices 200 based on the first reception result, detect position changes of the plurality of transmission devices 200 according to a result of comparing the determined present position with the prestored area map, and thus, reflect the present positions of the plurality of transmission devices 200 in the area map. In this case, the robot 100 may analyze a reception sensitivity of the first signal based on the first reception result and determine the present positions of the plurality of transmission devices 200 based on a result of the analysis. The robot 100 may also measure a distance between the plurality of transmission devices 200 based on the first reception result and determine the present positions of the plurality of transmission devices 200 based on a result of the measurement. The robot 100 may determine present positions of the plurality of transmission devices 200 based on the second reception result, detect position changes of the plurality of transmission devices 200 according to a result of comparing the determined present position with the prestored area map, and thus, reflect the present positions of the plurality of transmission devices 200 in the prestored area map. As such, the robot 100 for determining the present positions of the plurality of transmission device 200 based on at least one of the first reception result and the second reception result may determine the present positions of the plurality of transmission devices 200 according to a result of combining a result of the determination based on the first reception result with a result of the determination based on the second reception result. The robot 100 may determine the present positions of the plurality of transmission devices 200 and compare the determined present positions with arrangement positions designated in the prestored area map. As a result of the comparison, when the present positions of the transmission devices 200 do not match the arrangement positions, position changes of the transmission devices 200 may be detected. That is, when positions of the plurality of transmission devices 200 change from the arrangement positions designated in the prestored area map to the present positions determined according to at least one selected from the first reception result and the second reception result, the present positions of the plurality of transmission devices 200 do not match the arrangement positions due to position changes of the plurality of transmission devices 200. Thus, position change of the transmission devices 200 may be detected. After the robot 100 detects the position changes of the plurality of transmission devices 200, the robot 100 may reflect the present positions of the plurality of transmission devices 200 in the prestored area map to thereby update the prestored area map. The robot 100 may determine the present positions of the plurality of transmission devices 200 and compare the determined present positions with arrangement positions designated in the prestored area map. As a result of the comparison, when the present positions of the transmission devices 200 match the arrangement positions, position changes of the plurality of transmission devices 200 may not be detected. In this case, the robot 100 may not update but maintain the prestored area map.

As such, in the system 1, the robot 100 may detect position changes of the plurality of transmission devices 200 based on at least one selected from the first reception result and the second reception result, and update the prestored area map according to changed positions. Thus, accurate position recognition and traveling may be performed according to the prestored area map in which the present positions of the plurality of transmission devices 200 are reflected.

As described above, the system 1 may be applied to the robot 100 described above and a control method of a lawn mower robot system that is to be described below. In addition, embodiments of the robot 100 and the control method of the lawn mower robot system may be applied to the system 1.

Hereinafter, a control method of the lawn mower robot system according to the present disclosure (hereinafter referred to as a control method) will be described.

The control method is a method for controlling, by the system 1 shown in FIG. 3, the robot 100 shown in FIGS. 1B to 1D. The control method may be applied to the robot 100 and the system 1

The control method may be a method of controlling, by the system 1, the robot 100.

The control method may be a method of detecting a position change of the transmission device 200.

The control method may also be a method for updating the prestored area map by detecting a position change of the transmission device 200.

The control method may be a control method performed by the controller 20 included in the robot 100.

The control method may be classified into a control method (1), a control method (2), and a control method (3). Hereinafter, embodiments will be described by classifying the control method into the control method (1), the control method (2), and the control method (3).

As shown in FIG. 3A and FIG. 3B, the control method (1) is a control method performed by the system 1 including the plurality of transmission devices 200 and the robot 100, wherein the plurality of transmission devices 200 are provided in the travel area 1000 and transmits a signal for determining position information, and the robot 100 travels in the travel area 1000 and performs set operations based on a result of receiving the signal transmitted from the plurality of transmission devices 200 and a prestored area map in which arrangement positions of the plurality of transmission devices 200 are designated. As shown in FIG. 8, the control method includes traveling in the travel area 1000 according to the prestored area map (S11), receiving a signal transmitted from the plurality of transmission devices during the traveling (S12), determining present positions of the plurality of transmission devices 200 based on a result of the reception (S13), detecting position changes of the plurality of transmission devices 200 by comparing a result of the determination with arrangement positions designated in the prestored area map (S14), and reflecting the present positions of the plurality of transmission devices 200 in the prestored area map (S15).

That is, the system 1 may performs the controlling in an order from the traveling (S11), the receiving (S12), the determining (S13), the detecting (S14), to the reflecting (S15).

Here, as shown in FIG. 1B, the robot 100 may include the main body 10, the driving unit 11, the receiver 12, and the controller 20, wherein the driving unit 11 moves the main body 10, the receiver 12 receives a signal transmitted from the plurality of transmission devices 200, and the controller 20 controls traveling of the main body 10 by controlling the driving unit 11 so that the main body 10 travels in the travel area 1000, based on a result of the reception by the receiver 12 and the prestored area map in which arrangement positions of the plurality of transmission devices 200 are designated.

In the traveling (S11), the controller 20 may control the traveling of the main body 10 according to the prestored area map so that the controller 20 travels in the travel area 1000.

In the receiving (S12), the receiver 12 may receive a signal transmitted from the plurality of transmission devices 200 while the main body 10 is traveling in the travel area 1000.

In the determining (S13), the controller 20 may determine positions of the plurality of transmission devices 200 based on a result of the reception by the receiver 12.

In the determining (S13). a reception sensitivity of the signal may be analyzed based on the reception result and present positions of the plurality of transmission devices 200 may be determined based on a result of the analysis.

In the determining (S13), a distance between the plurality of transmission devices 200 may be measured based on the reception result, and the present positions of the plurality of transmission devices 200 may be determined based on a result of the measurement.

In the detecting (S14), the controller 20 may compare a result of the determination of the present positions of the plurality of transmission devices 200 with the arrangement positions designated in the prestored area map and, as a result of the comparison, detect position change of the plurality of transmission devices 200.

In the detecting (S14), as a result of comparing the present positions of the plurality of transmission devices 200 with the arrangement positions designated in the prestored area map, when the present positions of the plurality of transmission devices 200 do not match the arrangement positions, position changes of the plurality of transmission devices 200 may be detected.

In the detecting (S14), as a result of comparing the present positions of the transmission devices 200 with the arrangement positions designated in the prestored area map, when the present positions of the plurality of transmission devices 200 match the arrangement positions, position changes of the transmission devices 200 may not be detected.

In the reflecting (S15), the controller 20 may detect the position changes of the plurality of transmission devices 200 and update the prestored area map by reflecting changed present positions of the plurality of transmission devices 200 in the prestored area map.

In the reflecting (S15), when position change of the transmission devices 200 is detected, the present positions of the transmission devices 200 may be reflected in the prestored area map, and thus, the prestored area map may be updated.

In the reflecting (S15), when position change of the transmission devices 200 is not detected, the prestored area map may be maintained.

As such, with respect to the control method (1), the present positions of the plurality of transmission devices 200 may be determined based on a reception result of a UWB signal, position changes of the plurality of transmission devices 200 may be detected according to a result of comparing a result of the determination with the arrangement positions, and thus, the prestored area map may be updated according to changed positions.

The control method (1) including the traveling (S11), the receiving (S12), the determining (S13), the detecting (S14), and the reflecting (S15) can be implemented as computer-readable codes on a program-recorded medium. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20.

As shown in FIG. 3A and FIG. 3B, the control method (2) is a control method performed by the system 1 including the plurality of transmission devices 200, the communication device 400, and the robot 100, wherein the plurality of transmission devices 200 are provided in the travel area 1000 and transmit a signal for determining position information, the communication device 400 receives the signal and delivers a result of the reception to the robot 100, and the robot 100 travels in the travel area 1000 and performs set operations based on the reception result delivered by the communication device 4000 and the prestored area map in which the arrangement positions of the transmission devices 200 are designated. As shown in FIG. 9, the control method includes traveling in the travel area 1000 (S21) according to the area map, receiving, by the communication device 400, a signal transmitted from the transmission devices 200 (S22), receiving a delivery of a result of the reception from the communication device 400 (S23), determining present positions of the plurality of transmission devices 200 based on the reception result (S24), detecting position changes of the plurality of transmission devices 200 by comparing a result of the determination with arrangement positions designated in the prestored area map (S25), and reflecting the present positions of the plurality of transmission devices 200 in the prestored area map (S26).

That is, the system 1 may perform controlling in an order from the traveling (S21), the receiving (S22), the receiving of the delivery (S23), the determining (S24), the detecting (S25), to the reflecting (S15).

Here, as shown in FIG. 1B, the robot 100 includes the main body 10, the driving unit 11, the communication unit 13, and the controller 20, wherein the driving unit 11 moves the main body 10, the communication unit 13 receives a result of the reception of the signal by communicating with the communication device 400 that receives the signal transmitted from the transmission devices 200, and the controller 20 controls traveling of the main body 10 by controlling the driving unit 11 so that the main body 10 travels in the travel area 1000 based on the reception result and a prestored area map in which arrangement positions of the transmission devices 200 are designated.

In the traveling (S21), the controller 20 may control the traveling of the main body 10 according to the prestored area map so that the controller 20 travels in the travel area 1000.

In the receiving (S22), the communication device 400 may receive the signal transmitted from the plurality of transmission devices 200 while the main body 10 is traveling in the travel area 2000.

In the receiving (S22), the communication device 400 that is a GPS satellite may receive a GPS signal transmitted from the transmission devices 200 while the main body 10 is traveling in the travel area 1000.

In the receiving of the delivery (S23), the communication unit 13 may receive delivery of a result of the reception of the signal, transmitted by the plurality of transmission devices 200, from the communication device 400.

In the determining (S24), the controller 20 may determine positions of the plurality of transmission devices 200 based on the reception result delivered from the communication device 400 through the communication unit 13.

In the determining (S24). the present positions of the plurality of transmission devices 200 may be determined based on a result of the reception of the GPS signal.

In the detecting (S25), the controller 20 may compare a result of the determination of the present positions of the transmission devices 200 with the arrangement positions designated in the prestored area map and, according to a result of the comparison, detect position changes of the plurality of transmission devices 200.

In the detecting (S25), as a result of comparing the present positions of the transmission devices 200 with arrangement positions designated in the prestored area map, when the present positions of the plurality of transmission devices 200 do not match the arrangement positions, position changes of the plurality of transmission devices 200 may be detected.

In the detecting (S25), as a result of comparing the present positions of the plurality of transmission devices 200 with arrangement positions designated in the prestored area map, when the present positions of the plurality of transmission devices 200 match the arrangement positions, position changes of the plurality of transmission devices 200 may not be detected.

In the reflecting (S26), the controller 20 may detect position changes of the plurality of transmission devices 200 and update the prestored area map by reflecting changed present positions of the plurality of transmission devices 200 on the prestored area map.

In the reflecting (S26), when position changes of the plurality of transmission devices 200 are detected, the present positions of the plurality of transmission devices 200 may be reflected in the prestored area map, and thus, the prestored area map may be updated.

In the reflecting (S26), when position changes of the plurality of transmission devices 200 are not detected, the prestored area map may be maintained.

As such, with respect to the control method (2), the present positions of the plurality of transmission devices 200 may be determined based on the reception result of the GPS signal, position changes of the plurality of transmission devices 200 may be detected according to a result of comparing a result of the determination with the arrangement positions, and thus, the prestored area map may be updated according to changed positions.

The traveling (S21), the receiving (S22), the receiving of the delivery (S23), the determining (S24), the detecting (S25), and the reflecting (S26) can be implemented as a computer-readable code on a medium on which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20.

As shown in FIG. 3A and FIG. 3B, the control method (3) is a control method performed by the system 1 including the plurality of transmission devices 200, the communication device 400, and the robot 100, wherein the plurality of transmission devices 200 are provided in the travel area 1000 and transmit first and second signals for determining position information, the communication device 400 receives the second signal and delivers a result of the reception of the second signal to the robot 100, and the robot 100 receives the first signal, receives delivery of the reception result of the second signal from the communication device 400, and performs set operations while the robot 100 travels in the travel area 1000, based on at least one selected from a first reception result of the first signal and a second reception result of the second signal, and a prestored area map in which arrangement positions of the plurality of transmission devices 200 are designated. As shown in FIG. 10, the control method (3) includes traveling in the travel area 1000 according to the prestored area map (S100), receiving the first signal transmitted from the plurality of transmission devices 200 during the traveling and receiving delivery of the second reception result from the communication device 400 (S200), detecting position changes of the plurality of transmission devices 200 based on at least one selected from the first reception result and the second reception result (S300), determining present positions of the plurality of transmission devices 200 based on at least one selected from the first reception result and the second reception result (S400), and reflecting the present positions of the plurality of transmission devices 200 in the prestored area map (S500).

That is, the system 1 may performs the controlling in an order from the traveling (S100), the receiving of the delivery (S200), the determining (S300), the detecting (S400), to the reflecting (S500).

Here, as shown in FIG. 1B, the robot 100 may include the main body 10, the driving unit 11, the receiver 12, the communication unit 13, and the controller 20, wherein the driving unit 11 moves the main body 10, the receiver 12 receives the first signal transmitted from the plurality of transmission devices 200, the communication unit 13 receives the second reception result by communicating with the communication device 400 that receives the second signal transmitted from the plurality of transmission devices 200, and the controller 20 controls traveling of the main body 10 by controlling the driving unit 11 so that the main body 10 travels in the travel area 1000, based on at least one selected from the first reception result and the second reception result, and the prestored area map in which installation positions of the plurality of transmission devices 200 are designated.

In the traveling (S100), the controller 20 may control the traveling of the main body 10 according to the prestored area map so that the main body 10 travels in the travel area 1000.

In the receiving of the delivery (S200), the receiver 12 receives the first signal transmitted from the plurality of transmission devices 200 during the traveling in the travel area 1000, the communication device 400 receives the second signal, and thus, the communication unit 13 receives delivery of the second reception result from the communication device 400.

In the detecting (S300), the controller 20 may detect position changes of the plurality of transmission devices 200 based on at least one of the first reception result and the second reception result.

In the detecting (S300), the position changes of the plurality of transmission devices 200 may be detected based on the first reception result and previous detection history at a reception position of the first signal.

In the detecting (S300), a reception sensitivity of the first signal may be analyzed based on the first reception result, and the position changes of the plurality of transmission devices 200 may be detected according to a result of comparing a result of the analysis with analysis history included in the previous detection history.

In the detecting (S300), when the analysis result is different from the analysis history, the position changes of the plurality of transmission devices 200 may be detected, or when the analysis result is not different from the analysis history, the position changed of the plurality of transmission devices 200 may not be detected.

In addition, in the detecting (S300), a distance between the plurality of transmission devices 200 may be measured based on the first reception result, and position changes of the plurality of transmission devices 200 may be detected according to a result of comparing a result of the measurement with measurement history included in the previous detection history.

In the detecting (S300), when the measurement result is different from the measurement history, the position changes of the plurality of transmission devices 200 may be detected, or when the measurement result is not different from the measurement history, the position changes of the plurality of transmission devices 200 may not be detected.

In the detecting (S300), posture states of the plurality of transmission devices 200 may be detected by extracting posture information of the plurality of transmission devices 200 included in the first signal based on the first reception result and, according to a result of comparing a result of the detection with detection history included in the previous detection history, the controller 20 may detect the position changes of the plurality of transmission devices 200.

In the detecting (S300), when the detection result is different from the detection history, the position changes of the plurality of transmission devices 200 may be detected, or when the detection result is not different from the detection history, the position changes of the plurality of transmission devices 200 may not be detected.

In the detecting (S300), present positions of the plurality of transmission devices 200 may be determined based on the second reception result, and position changes of the plurality of transmission devices 200 may be detected according to a result of comparing the present positions with the arrangement positions designated in the prestored area map.

In the detecting (S300), when the present positions are different from the arrangement positions, the position changes of the plurality of transmission devices 200 may be detected, or when the present positions are not different from the arrangement positions, the position changes of the plurality of transmission devices 200 may not be detected.

In the determining (S400), the controller 20 may determine present positions of the plurality of transmission devices 200 based on at least one selected from the first reception result and the second reception result.

In the determining (S400), when position changes of the transmission devices 200 are detected, present positions of the plurality of transmission devices 200 mat be determined based on at least one selected from the first reception result and the second reception result.

In the determining (S400), present positions of the transmission devices 200 may be determined based on at least one selected from a reception sensitivity of the signal according to the first reception result, distances between the main body 10 and the plurality of transmission devices 200, and the distances between the plurality of transmission devices 200.

In the determining (S400), the present positions of the transmission devices 200 may be determined by combining a result of the determination based on the reception sensitivity of the first signal with a result of the determination based on the distance between the plurality of transmission devices 200.

In the determining (S400), the present positions of the plurality of transmission devices 200 may be determined based on the second reception result that is a result of the reception of the GPS signal.

In the determining (S400), the present positions of the plurality of transmission devices 200 may be determined by combining a result of the determination based on the first reception result with a result of the determination based on the second reception result.

In the reflecting (S500), the controller 20 may detect position changes of the plurality of transmission devices 200, and thus, and update the prestored area map by reflecting changed present positions of the plurality of transmission devices 200 in the prestored area map.

In the reflecting (S500), when position changes of the plurality of transmission devices 200 are detected, the present positions of the plurality of transmission devices 200 may be reflected in the prestored area map, and thus, the prestored area map may be updated.

In the reflecting (S500), when position changes of the plurality of transmission devices 200 are not detected, the prestored area map may be maintained.

As described above, in the control method (3), position changes of the plurality of transmission device 200 may be detected based on at least one selected from the reception result of the UWB signal and the reception result of the GPS signal, the present positions of the plurality of transmission device 200 may be determined, and thus, the prestored area map may be updated according to changed positions.

The control method (3) including the traveling (S100), the receiving (S200), the detecting (S300), the determining (S400), and the reflecting (S500) can be implemented as computer-readable codes on a program-recorded medium. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20.

As described above, a lawn mower robot, a lawn mower robot system and a control method of the lawn mower robot system according to the present disclosure may be applied and implemented with respect to a control element for a lawn mower robot, a lawn mower robot system, a control system of a lawn mower robot, a method for controlling a lawn mower robot, a method for monitoring a region for a lawn mower robot, a method of controlling monitoring of a region for a lawn mower robot, etc. In particular, the lawn mower robot, the lawn mower robot system and the control method of the lawn mower robot system according to the present disclosure may be usefully applied and implemented with respect to a lawn mower robot, a control system of a lawn mower robot, a method for controlling a lawn mower robot, a method for detecting a position change of a lawn mower robot, a method for updating an area map for a lawn mower robot, etc. However, the technology disclosed in this specification is not limited thereto, and may be implemented as any lawn mower robot, a control element for controlling a lawn mower robot, a lawn mower robot system, a method for controlling a lawn mower robot, or the like to which the technical idea of the above-described technology may be applied.

While the present disclosure has been particularly shown and described with reference to embodiments thereof, it will be understood that various changes in form and details may be made therein without departing from the spirit and scope of the present disclosure as defined by the following claims. Therefore, the scope of the present disclosure should not be limited by the described embodiments, but should be determined by the scope of the appended claims and equivalents thereof.

While the present disclosure has been particularly shown and described with reference to exemplary embodiments, described herein, and drawings, it may be understood by one of ordinary skill in the art that various changes and modifications thereof may be made. Accordingly, the scope of the present disclosure should be defined by the following claims, and various changes equal or equivalent to the claims pertain to the category of the concept of the present disclosure.

What is claimed is:

1. A lawn mower robot comprising:
a main body;
a driving unit configured to move the main body;
a receiver configured to receive a signal transmitted from at least one transmission device in a travel area; and
a controller configured to:
control the driving unit based on a result and a prestored area map so that the main body travels in the travel area, wherein the result is based on the signal received by the receiver, and the area map includes an arrangement position of the at least one transmission device,
detect a position change of the at least one transmission device based on the result, and
update the area map by determining a present position of the at least one transmission device in the area map according to the position change,
wherein the controller is further configured to
detect the position change of the at least one transmission device based on the result and previous detection history at a reception position of the signal, and
determine the present position of the at least one transmission device based on the result to thereby reflect the present position of the at least one transmission device in the area map.

2. The lawn mower robot of claim 1, wherein the controller is configured to
determine a reception sensitivity of the signal based on the result, and
detect the position change of the at least one transmission device according to a comparison of the reception sensitivity with analysis history included in the previous detection history.

3. The lawn mower robot of claim 2, wherein the controller is configured to detect the position change of the at least one transmission device when the reception sensitivity is different from the analysis history.

4. The lawn mower robot of claim 1, wherein the controller is configured to
measure a distance between two or more transmission devices based on the result, and
detect the position change of the at least one transmission device according to a comparison of the distance with measurement history included in the previous detection history.

5. The lawn mower robot of claim 4, wherein the controller is configured to detect the position change of the at least one transmission device when the distance is different from the measurement history.

6. The lawn mower robot of claim 1, wherein the controller is configured to
  detect a posture state of the at least one transmission device based on the result by extracting posture information of the at least one transmission device included in the signal, and
  detect the position change of the at least one transmission device according to a comparison of the posture state with posture detection history included in the previous detection history.

7. The lawn mower robot of claim 6, wherein the controller is configured to detect the position change of the at least one transmission device when the posture state is different from the posture detection history.

8. The lawn mower robot of claim 1, wherein the controller is configured to
  determine the present position of the at least one transmission device based on the result and
  detect the position change of the at least one transmission device according to a comparison of the present position with the area map to thereby reflect the present position of the at least one transmission device in the area map.

9. The lawn mower robot of claim 8, wherein the controller is configured to
  determine a reception sensitivity of the signal based on the result, and
  determine the present position of the at least one transmission device based on the reception sensitivity.

10. The lawn mower robot of claim 8, wherein the controller is configured to
  measure a distance between two or more transmission devices based on the result, and
  determine the present position of the at least one transmission device based on the distance.

11. The lawn mower robot of claim 8, wherein the controller is configured to determine at least one of (i) whether the present position of the at least one transmission device is appropriate and (ii) an appropriate position of the at least one transmission device, based on the result.

12. A lawn mower robot comprising:
  a main body;
  a driving unit configured to move the main body;
  a communication unit configured to communicate with a communication device configured to receive a signal transmitted from at least one transmission device provided in a travel area, and thus, receive a reception result; and
  a controller configured to
    control the driving unit based on the reception result and a prestored area map which includes an arrangement position of the at least one transmission device,
    determine a present position of the at least one transmission device based on the reception result,
    detect a position change of the at least one transmission device based on a comparison of the present position with the area map, and
    update the area map with the present position of the at least one transmission device,
  wherein the controller is further configured to
  detect the position change of the at least one transmission device based on the result and previous detection history at a reception position of the signal, and
  determine the present position of the at least one transmission device based on the result to thereby reflect the present position of the at least one transmission device in the area map.

13. A lawn mower robot system comprising:
  a lawn mower robot;
  a plurality of transmission devices that are provided in a travel area and that are configured to transmit first and second signals for determining position information; and
  a communication device configured to receive the second signals and deliver a result of reception to the lawn mower robot,
  wherein the lawn mower robot is configured to:
    receive the first signal,
    receive the result of reception of the second signal delivered from the communication device,
    perform a set operation while traveling in the travel area based on at least one of (i) a first reception result of the first signal and (ii) the result of reception of the second signal, and based on a prestored area map which includes arrangement positions of the plurality of transmission devices,
    detect position changes of the plurality of transmission devices based on at least one of (i) the first reception result and (ii) the result of reception of the second signal, and
    determine present positions of the plurality of transmission devices in the area map according to the position changes,
  wherein the lawn mower robot is further configured to:
    detect the position changes of the plurality of transmission devices based on the first reception result and previous detection history at a reception position of the first signal, and
    determine the present positions of the plurality of transmission devices based on at least one of (i) the first reception result and (ii) the result of reception of the second signal, and thereby reflect the present positions of the plurality of transmission devices in the area map.

14. The lawn mower robot system of claim 13, wherein the first signal is an ultra-wideband (UWB) signal of which reception result varies depending on a reception position, and
the second signal is a global positioning system (GPS) signal.

15. The lawn mower robot system of claim 13, wherein the lawn mower robot is configured to
  determine the present positions of the plurality of transmission devices based on at least one of (i) the first reception result and (ii) the result of reception of the second signal, and
  detect the position changes of the plurality of transmission devices according to a comparison of the present positions with the area map to thereby reflect the present positions of the plurality of transmission devices in the area map.

16. A control method of a lawn mower robot system comprising: a plurality of transmission devices that are provided in a travel area and that are configured to transmit a signal for determining position information; and a lawn mower robot configured to perform a set operation while traveling in the travel area based on a result of receiving the signal transmitted from the plurality of transmission devices and a prestored area map which includes arrangement positions of the plurality of transmission devices, the control method comprising:
  traveling in the traveling area according to the prestored area map;

receiving the signal transmitted from the plurality of transmission devices during the traveling;

determining present positions of the plurality of transmission devices based on the result;

detecting position changes of the plurality of transmission devices by comparing the present positions with the arrangement positions in the area map or based on the result and previous detecting history at a reception position of the signal; and updating the present positions of the plurality of transmission devices on the area map.

17. A control method of a lawn mower robot system comprising: a plurality of transmission devices that are provided in a travel area and that are configured to transmit a signal for determining position information; a communication device configured to receive the signal and deliver a result of reception to a lawn mower robot; and the lawn mower robot, wherein the lawn mower robot is configured to perform a set operation during traveling in the travel area based on the result of reception delivered from the communication device and a prestored area map which includes arrangement positions of the plurality of transmission devices, the control method comprising:

traveling in the traveling area according to the area map;

receiving, by the communication device, the signal transmitted from the plurality of transmission devices;

receiving the result of reception delivered from the communication device;

determining present positions of the plurality of transmission devices based on the result of reception;

detecting position changes of the plurality of transmission devices by comparing the present positions with the arrangement positions in the area map; and updating the present positions of the plurality of transmission devices on the area map.

18. A control method of a lawn mower robot system comprising: a plurality of transmission devices that are provided in a travel area and that are configured to transmit first and second signals for determining position information;

a communication device configured to receive the second signal and to deliver a result of reception to the lawn mower robot; and the lawn mower robot, wherein the lawn mower robot is configured to receive the first signal, to receive the result of reception of the second signal delivered from the communication device, and to perform a set operation during traveling in the travel area based on at least one of (i) a first reception result of the first signal and (ii) the result of reception of the second signal, and based on a prestored area map which includes arrangement positions of the plurality of transmission devices, the control method comprising:

traveling in the traveling area according to the area map;

receiving the first signal transmitted from the plurality of transmission devices during the traveling and receiving the result of reception of the second signal delivered from the communication device;

detecting position changes of the plurality of transmission devices based on at least one of (i) the first reception result and (ii) the result of reception of the second signal;

determining present positions of the plurality of transmission devices based on at least one of (i) the first reception result and (ii) the result of reception of the second signal; and updating the present positions of the plurality of transmission devices on the area map.

* * * * *